(12) United States Patent
Szumilas

(10) Patent No.: US 7,483,377 B2
(45) Date of Patent: Jan. 27, 2009

(54) METHOD AND APPARATUS TO PRIORITIZE NETWORK TRAFFIC

(75) Inventor: Lech Szumilas, Ennis (IE)

(73) Assignee: Intel Corporation, Santa Clara, CA (US)

( * ) Notice: Subject to any disclaimer, the term of this patent is extended or adjusted under 35 U.S.C. 154(b) by 694 days.

(21) Appl. No.: 11/069,110

(22) Filed: Mar. 1, 2005

(65) Prior Publication Data

US 2006/0198385 A1   Sep. 7, 2006

(51) Int. Cl.
*H04L 12/56* (2006.01)
*G06F 3/00* (2006.01)

(52) U.S. Cl. .................. 370/235; 370/412; 370/429; 710/29; 710/44; 710/52

(58) Field of Classification Search .............. 370/235, 370/412, 429; 710/29, 44, 52
See application file for complete search history.

(56) References Cited

U.S. PATENT DOCUMENTS

| | | | | |
|---|---|---|---|---|
| 5,301,275 A * | 4/1994 | Vanbuskirk et al. | ............ | 710/48 |
| 5,479,407 A * | 12/1995 | Ko et al. | .................. | 370/231 |
| 5,751,951 A * | 5/1998 | Osborne et al. | ............. | 709/250 |
| 5,974,518 A * | 10/1999 | Nogradi | ................... | 711/173 |
| 6,012,110 A * | 1/2000 | Olson et al. | .................. | 710/60 |
| 6,061,274 A * | 5/2000 | Thibault et al. | ......... | 365/189.05 |
| 6,212,593 B1 * | 4/2001 | Pham et al. | ................. | 710/266 |
| 6,298,396 B1 * | 10/2001 | Loyer et al. | ................... | 710/22 |
| 6,496,516 B1 * | 12/2002 | Dabecki et al. | ............. | 370/460 |
| 6,532,509 B1 * | 3/2003 | Wolrich et al. | ............. | 710/240 |
| 6,556,540 B1 * | 4/2003 | Mawhinney et al. | ........ | 370/229 |
| 6,795,902 B2 * | 9/2004 | Frick | ......................... | 711/153 |
| 7,181,742 B2 * | 2/2007 | Hooper | ....................... | 718/100 |
| 7,336,606 B2 * | 2/2008 | Romano et al. | ............. | 370/230 |
| 7,355,969 B2 * | 4/2008 | Champlin et al. | ............ | 370/230 |
| 7,362,704 B2 * | 4/2008 | Sisto et al. | .................. | 370/230 |
| 7,376,080 B1 * | 5/2008 | Riddle et al. | ................ | 370/229 |
| 2002/0120730 A1 * | 8/2002 | Goudzwaard et al. | ....... | 709/223 |
| 2003/0081624 A1 * | 5/2003 | Aggarwal et al. | ........... | 370/412 |
| 2003/0202470 A1 | 10/2003 | Szumilas | | |
| 2003/0231627 A1 * | 12/2003 | John et al. | .................. | 370/389 |
| 2003/0235194 A1 * | 12/2003 | Morrison | .................... | 370/389 |
| 2004/0071154 A1 * | 4/2004 | Wentink | ...................... | 370/448 |
| 2005/0111398 A1 * | 5/2005 | Wybenga et al. | ............ | 370/328 |

* cited by examiner

*Primary Examiner*—Alpus H Hsu
(74) *Attorney, Agent, or Firm*—Daly, Crowley, Mofford & Durkee, LLP

(57) ABSTRACT

A processor prioritizes data traffic by limiting a number of data buffers that can be retrieved. By limiting the number of data buffers that can be retrieved, some packets are dropped on a receive side to save processing cycles that would be spent processing packets that may be dropped on the transmit side after processing.

23 Claims, 21 Drawing Sheets

METHOD AND APPARATUS TO PRIORITIZE NETWORK TRAFFIC

CROSS REFERENCE TO RELATED APPLICATIONS

Not Applicable.

STATEMENT REGARDING FEDERALLY SPONSORED RESEARCH

Not Applicable.

BACKGROUND

As is known in the art, network processors can be used to pass data traffic to various networks over different network interfaces. However, network processors may not be able to serve interfaces at line-rate data throughput due to limited processing power or insufficient memory bandwidth.

A network processor (NP) should ideally pass network packets from a source (a first network) to a destination (a second network) without losing any packets. However, various factors can cause packets to be dropped. A network processor may have insufficient processing power to handle all packets. The maximum possible data throughput for one network and associated media connection to the network processor is often different than for other networks/media connected to the network. A 'slower' media/network may not be able to accept all packets from a 'faster' media/network. Data throughput from a particular network is usually limited by the media.

Assume that a software application operating on a network processor is trying to handle network packets incoming on attached networks. Also assume that a first network has a data throughput twice that of a second network coupled to the network processor due to media limitations, for example. Packets from the first network are routed to the second network. If the first network is submitting packets to the network processor at line rate (i.e., as fast as media allows) then only half of those packets will reach the second network. Thus, the network processor may drop about half of the packets from the first network due to insufficient bandwidth in the second network. Reception of each packet involves a number of processing tasks so that if the packet is dropped later on, then the processing time used for receiving and processing the packet is wasted.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
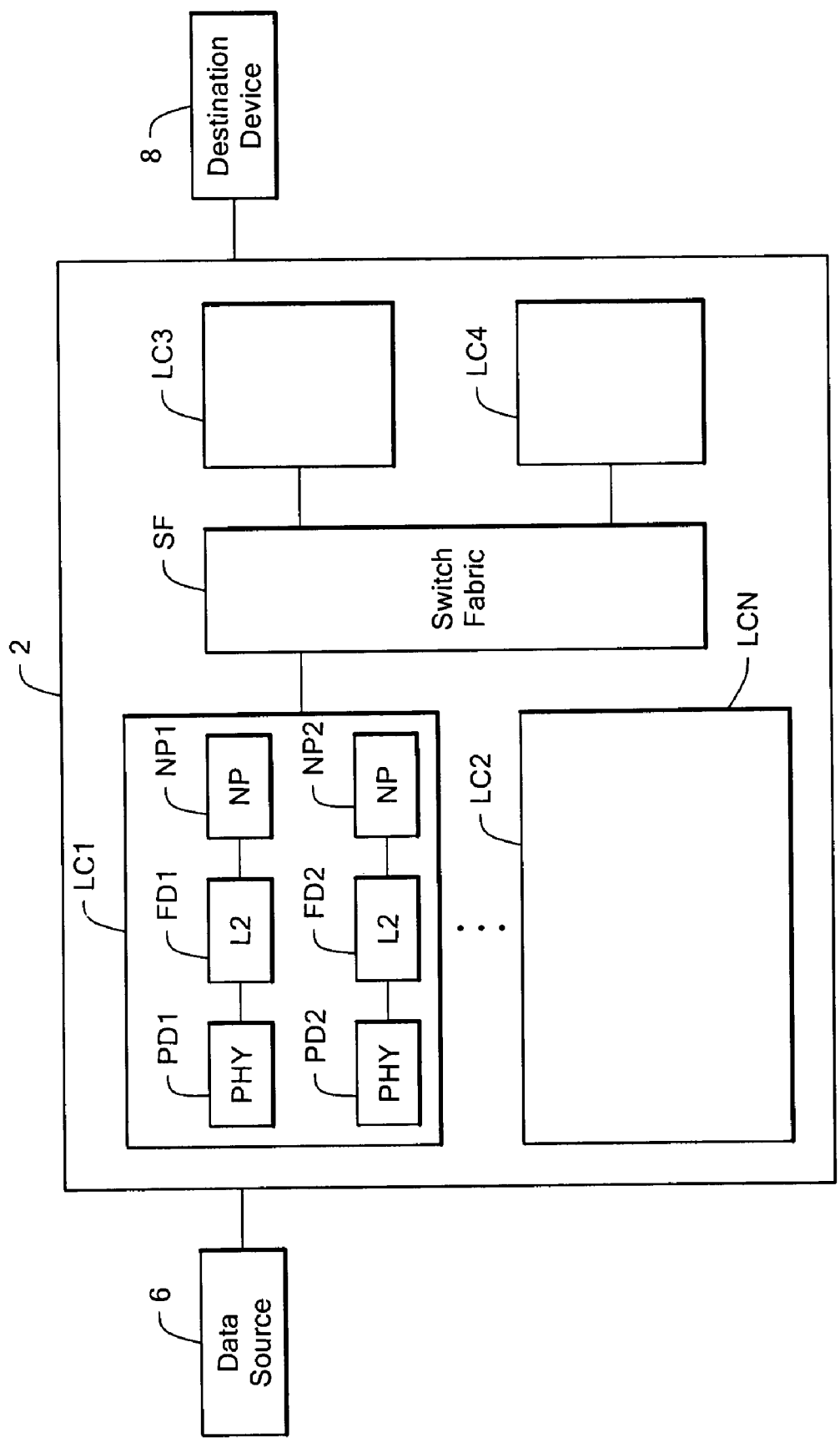
FIG. 1 is a diagram of an exemplary system including a network device having a network processor with traffic prioritization.

FIG. 1 shows an exemplary network device 2 having network processor units (NPUs) including network processors that can be programmed to prioritize network traffic. Incoming packets from a data source 6 are processed and transmitted to a destination device 8. The network device 2 can include, for example, a router, a switch, and the like. The data source 6 and destination device 8 can include various network devices now known, or yet to be developed, that can be connected over a communication path, such as an optical path having a OC-192 line speed.

The illustrated network device 2 can manage traffic as described in detail below. The device 2 features a collection of line cards LC1-LC4 ("blades") interconnected by a switch fabric SF (e.g., a crossbar or shared memory switch fabric). The switch fabric SF, for example, may conform to CSIX (Common Switch Interface) or other fabric technologies such as HyperTransport, Infiniband, PCI (Peripheral Component Interconnect), Packet-Over-SONET (Synchronous Optic Network), RapidIO, and/or UTOPIA (Universal Test and Operations PHY Interface for ATM). Some network processors, such as Intel network processors, can provide one or more of such interfaces in a multi-core, single die configuration.

Individual line cards (e.g., LC1) may include one or more physical layer (PHY) devices PD1, PD2 (e.g., optic, wire, and wireless PHYs) that handle communication over network connections. The PHYs PD translate between the physical signals carried by different network mediums and the bits (e.g., "0"-s and "1"-s) used by digital systems. The line cards LC may also include framer devices (e.g., Ethernet, Synchronous Optic Network (SONET), High-Level Data Link (HDLC) framers or other "layer 2" devices) FD1, FD2 that can perform operations on frames such as error detection and/or correction. The line cards LC shown may also include one or more network processors NP1, NP2 that perform packet processing operations for packets received via the PHY(s) and direct the packets, via the switch fabric SF, to a line card LC providing an egress interface to forward the packet. Potentially, the network processor(s) NP may perform "layer 2" duties instead of the framer devices FD.

Figure 2:
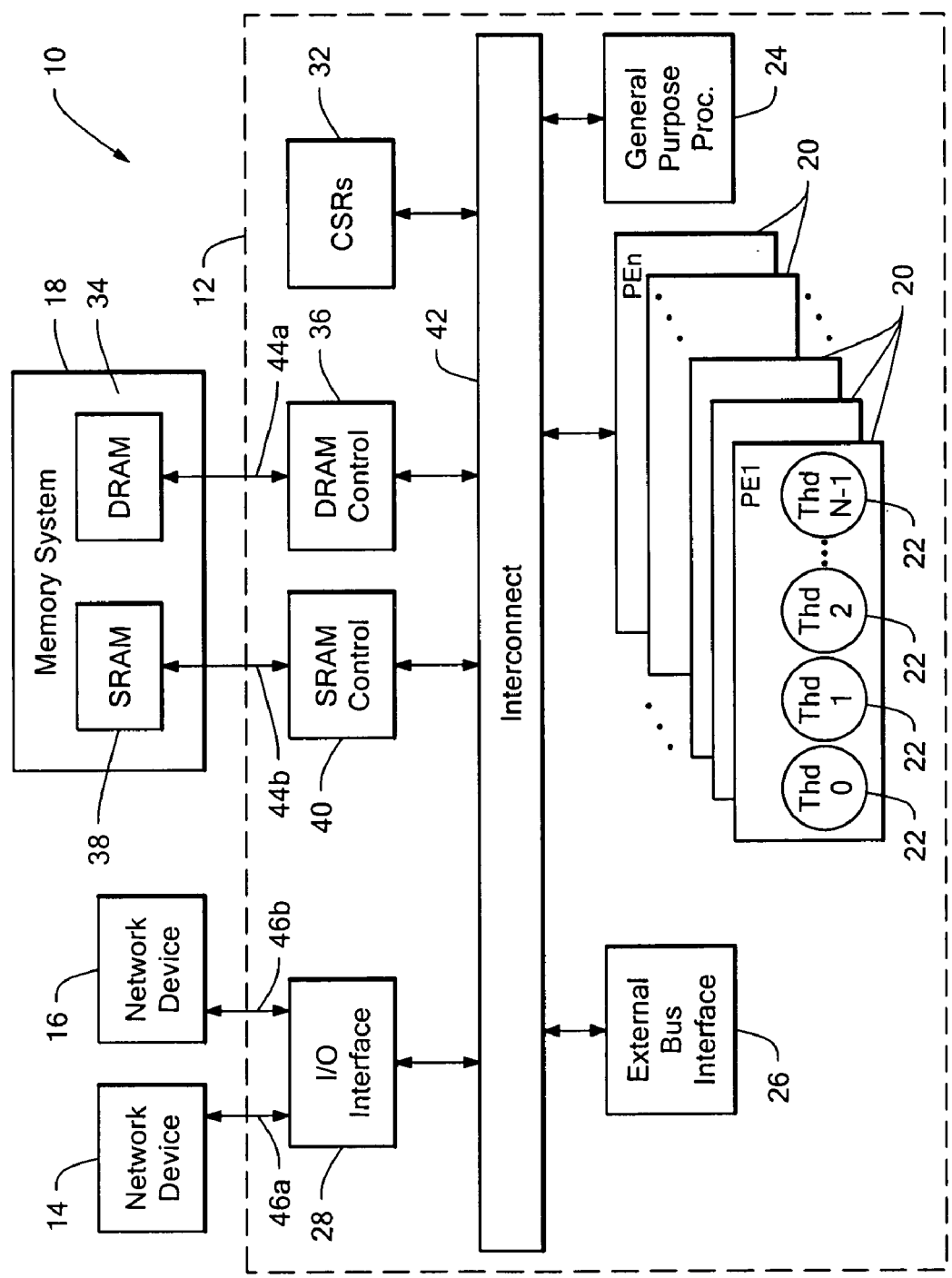
FIG. 2 is a diagram of an exemplary network processor having traffic prioritization.

FIG. 2 shows an exemplary system 10 including a processor 12, which can be provided as a network processor having multiple cores on a single die. The processor 12 is coupled to one or more I/O devices, for example, network devices 14 and 16, as well as a memory system 18. The processor 12 includes multiple processors ("processing engines" or "PEs") 20, each with multiple hardware controlled execution threads 22. In the example shown, there are "n" processing elements 20, and each of the processing elements 20 is capable of processing multiple threads 22, as will be described more fully below. In the described embodiment, the maximum number "N" of threads supported by the hardware is eight. Each of the processing elements 20 is connected to and can communicate with adjacent processing elements.

In one embodiment, the processor 12 also includes a general-purpose processor 24 that assists in loading microcode control for the processing elements 20 and other resources of the processor 12, and performs other computer type functions such as handling protocols and exceptions. In network processing applications, the processor 24 can also provide support for higher layer network processing tasks.

The processing elements 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, and so forth.

The devices 14, 16 can be any network devices capable of transmitting and/or receiving network traffic data, such as framing/MAC (Media Access Control) devices, e.g., for connecting to 10/100BaseT Ethernet, Gigabit Ethernet, ATM (Asynchronous Transfer Mode) or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also be serviced by the processor 12.

In general, as a network processor, the processor 12 can interface to various types of communication devices or interfaces that receive/send data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 3:
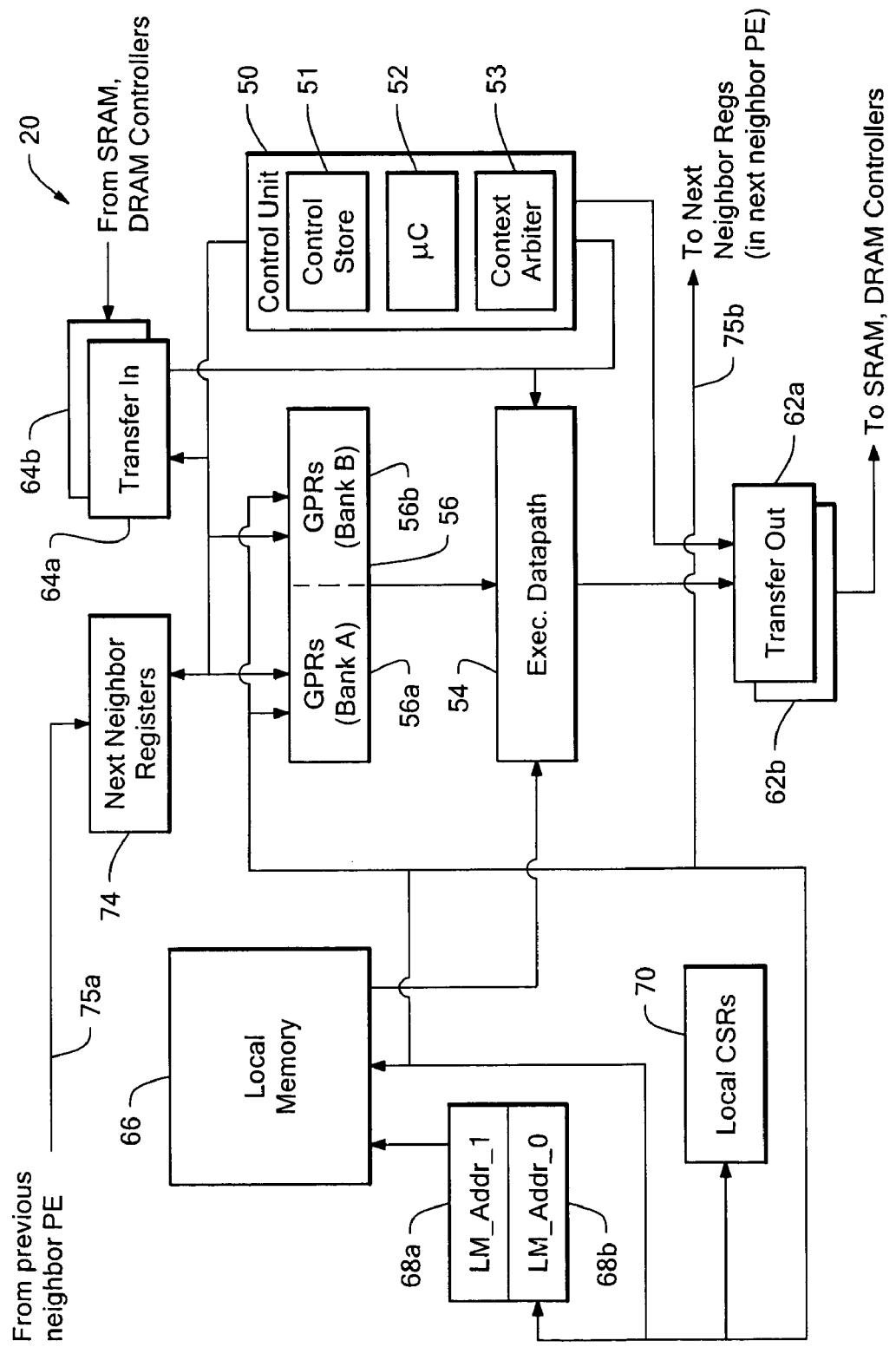
FIG. 3 is a diagram of an exemplary processing element (PE) that runs microcode.

Referring to FIG. 3, an exemplary one of the processing elements 20 is shown. The processing element (PE) 20 includes a control unit 50 that includes a control store 51, control logic (or microcontroller) 52 and a context arbiter/event logic 53. The control store 51 is used to store microcode. The microcode is loadable by the processor 24. The functionality of the PE threads 22 is therefore determined by the microcode loaded via the core processor 24 for a particular user's application into the processing element's control store 51.

The microcontroller 52 includes an instruction decoder and program counter (PC) unit for each of the supported threads. The context arbiter/event logic 53 can receive messages from any of the shared resources, e.g., SRAM 38, DRAM 34, or processor core 24, and so forth. These messages provide information on whether a requested function has been completed.

The PE 20 also includes an execution datapath 54 and a general purpose register (GPR) file unit 56 that is coupled to the control unit 50. The datapath 54 may include a number of different datapath elements, e.g., an ALU, a multiplier and a Content Addressable Memory (CAM).

The registers of the GPR file unit 56 (GPRs) are provided in two separate banks, bank A 56a and bank B 56b. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The PE 20 further includes a write transfer (transfer out) register file 62 and a read transfer (transfer in) register file 64. The write transfer registers of the write transfer register file 62 store data to be written to a resource external to the processing element. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the processing element 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any PE to access the transfer registers of any other PE.

Also included in the PE 20 is a local memory 66. The local memory 66 is addressed by registers 68a ("LM_Addr_1"), 68b ("LM_Addr_0"), which supplies operands to the datapath 54, and receives results from the datapath 54 as a destination.

The PE 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the processing element as well.

Other register types of the PE 20 include next neighbor (NN) registers 74, coupled to the control store 50 and the execution datapath 54, for storing information received from a previous neighbor PE ("upstream PE") in pipeline processing over a next neighbor input signal 76a, or from the same PE, as controlled by information in the local CSRs 70. A next neighbor output signal 76b to a next neighbor PE ("downstream PE") in a processing pipeline can be provided under the control of the local CSRs 70. Thus, a thread on any PE can signal a thread on the next PE via the next neighbor signaling.

While illustrative target hardware is shown and described herein in some detail, it is understood that the exemplary embodiments shown and described herein for efficient memory access for queue control structures they are applicable to a variety of hardware, processors, architectures, devices, development systems/tools and the like.

Figure 4:
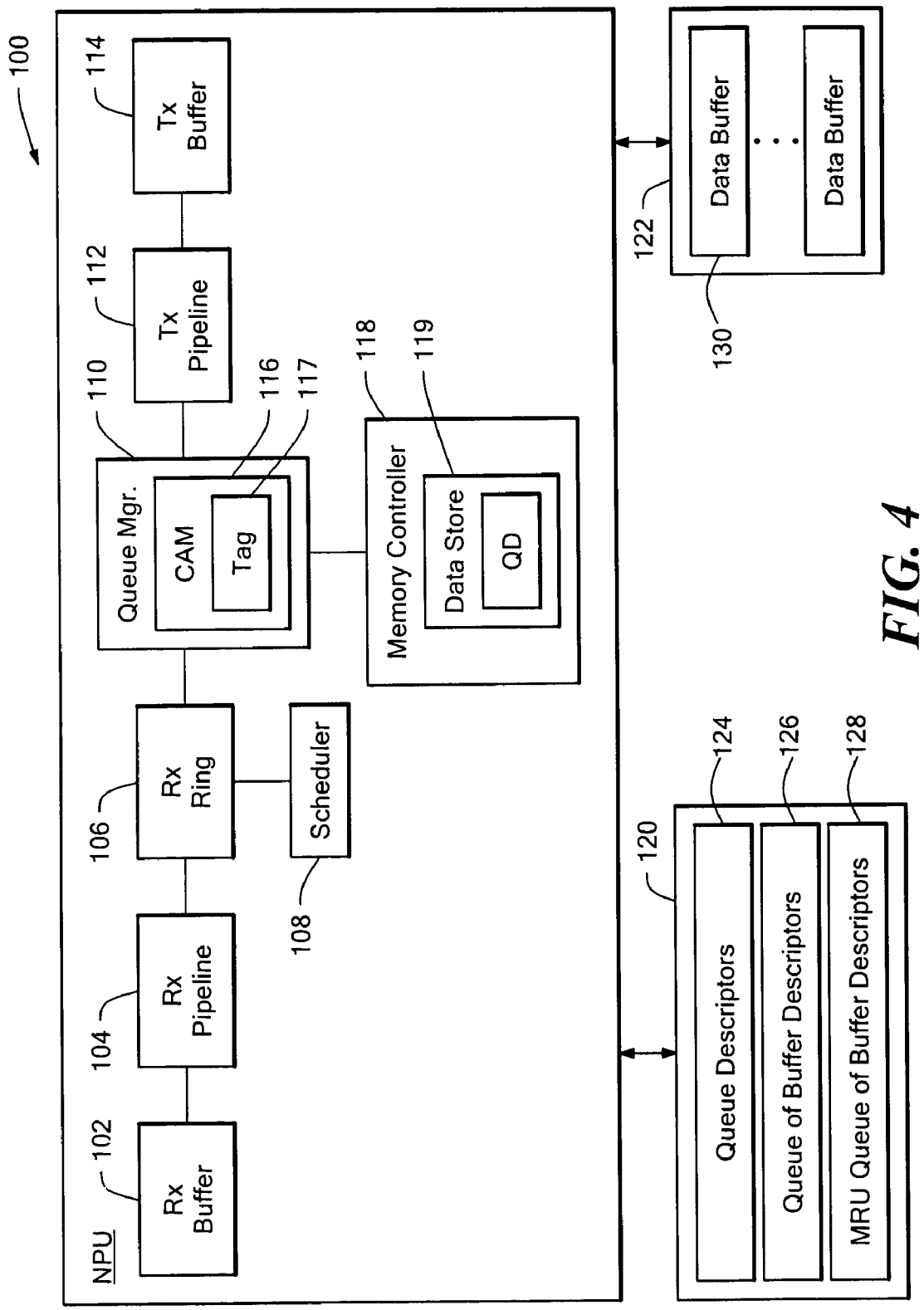
FIG. 4 is a diagram showing an exemplary queuing arrangement.

FIG. 4 shows an exemplary NPU application 100 receiving incoming data and transmitting the processed data using queue data control structures. As described above, processing elements in the NPU application 100 can perform various functions. In the illustrated embodiment, the NPU application 100 includes a receive buffer 102 providing data to a receive pipeline 104 that sends data to a receive ring 106, which may have a first-in-first-out (FIFO) data structure, under the control of a scheduler 108. A queue manager 110 receives data from the ring 106 and ultimately provides queued data to a transmit pipeline 112 and transmit buffer 114. The queue manager 110 includes a content addressable memory (CAM) 116 having a tag area to maintain a list 117 of tags each of which points to a corresponding entry in a data store portion 119 of a memory controller 118. In one embodiment, each processing element includes a CAM to cache a predetermined number, e.g., sixteen, of the most recently used (MRU) queue descriptors. The memory controller 118 communicates with the first and second memories 120, 122 to process queue commands and exchange data with the queue manager 110. The data store portion 119 contains cached queue descriptors, to which the CAM tags 117 point.

The first memory 120 can store queue descriptors 124, a queue of buffer descriptors 126, and a list of MRU (Most Recently Used) queue of buffer descriptors 128 and the second memory 122 can store processed data in data buffers 130, as described more fully below.

While first and second memories 102, 122 are shown, it is understood that a single memory can be used to perform the functions of the first and second memories. In addition, while the first and second memories are shown being external to the NPU, in other embodiments the first memory and/or the second memory can be internal to the NPU.

The receive buffer 102 buffers data packets each of which can contain payload data and overhead data, which can include the network address of the data source and the network address of the data destination. The receive pipeline 104 processes the data packets from the receive buffer 102 and stores the data packets in data buffers 130 in the second memory 122. The receive pipeline 104 sends requests to the queue manager 110 through the receive ring 106 to append a buffer to the end of a queue after processing the packets. Exemplary processing includes receiving, classifying, and storing packets on an output queue based on the classification.

An enqueue request represents a request to add a buffer descriptor that describes a newly received buffer to the queue of buffer descriptors 126 in the first memory 120. The receive pipeline 104 can buffer several packets before generating an enqueue request.

The scheduler 108 generates dequeue requests when, for example, the number of buffers in a particular queue of buffers reaches a predetermined level. A dequeue request represents a request to remove the first buffer descriptor. The scheduler 108 also may include scheduling algorithms for generating dequeue requests such as "round robin", priority-based, or other scheduling algorithms. The queue manager 110, which can be implemented in one or more processing elements, processes enqueue requests from the receive pipeline 104 and dequeue requests from the scheduler 108.

Figure 5:
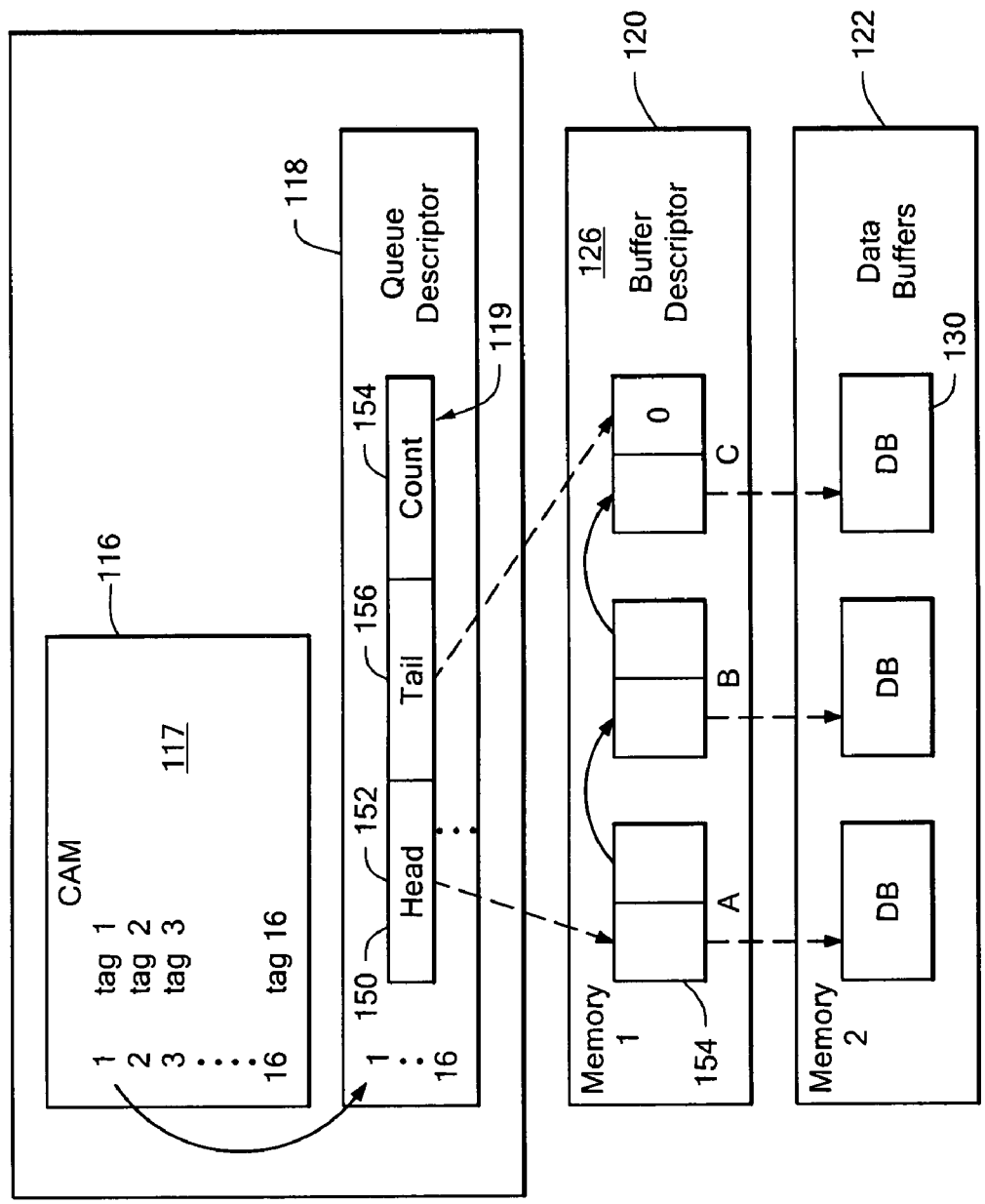
FIG. 5 is a diagram showing queue control structures.

FIG. 5, in combination with FIG. 4, shows exemplary data structures that describe the queues using queue descriptors managed by a queue manager. In one embodiment, the memory controller 118 includes a cached queue descriptor 150 having a head pointer 152 that points to the first entry 154 of a queue A, a tail pointer 156 that points to the last entry C of a queue, and a count field 154 which indicates the number of entries currently on the queue.

The tags 117 are managed by the CAM 116, which can include a least recently used (LRU) cache entry replacement policy. The tags 117 reference a corresponding one of the last N queue descriptors in the memory controller 118 used to perform an enqueue or dequeue operation, where N is the number of entries in the CAM. The queue descriptor location in memory is stored as a CAM entry. The actual data placed on the queue is stored in the second memory 122 in the data buffers 130 and is referenced by the queues of buffer descriptors 126 located in the first memory 120.

For single-buffer packets, an enqueue request references a tail pointer 156 and a dequeue request references a head pointer 152. The memory controller 118 maintains a predetermined number, e.g., sixteen, of the most recently used (MRU) queue descriptors 150. Each cached queue descriptor includes pointers to the corresponding MRU queue of buffer descriptors 128 in the first memory 120.

There is a mapping between the memory address of each buffer descriptor 126 (e.g., A, B, C) and the memory address of the buffer 130. The buffer descriptor can include an address field (pointing to a data buffer), a cell count field, and an end of packet (EOP) bit. Because each data buffer may be further divided into cells, the cell count field includes information about a cell count of the buffer. In one embodiment, the first buffer descriptor added to a queue will be the first buffer descriptor removed from the queue. For example, each buffer descriptor A, B in a queue, except the last buffer descriptor in the queue, includes a buffer descriptor pointer to the next buffer descriptor in the queue in a linked list arrangement. The buffer descriptor pointer of the last buffer descriptor C in the queue can be null.

The uncached queue descriptors 124 in the first memory 120 are not referenced by the memory controller. Each uncached queue descriptor 124 can be assigned a unique identifier and can include pointers to a corresponding uncached queue of buffer descriptors 126. And each uncached queue of buffer descriptors 126 can includes pointers to the corresponding data buffers 130 in the second memory 122.

Each enqueue request can include an address of the data buffer 130 associated with the corresponding data packet. In addition, each enqueue or dequeue request can include an identifier specifying either an uncached queue descriptor 124 or a MRU queue descriptor in the memory controller 118 associated with the data buffer 130.

While exemplary queue control structures are described herein, it is understood that the memory bank conflict avoidance mechanism described herein is applicable to a variety of alternative queue control structures.

In exemplary embodiments, a processor handling network traffic can prioritize a first service (particular source to destination) over a second service and/or prioritize reception (Rx) over transmission (Tx) or vice versa.

Figure 6:
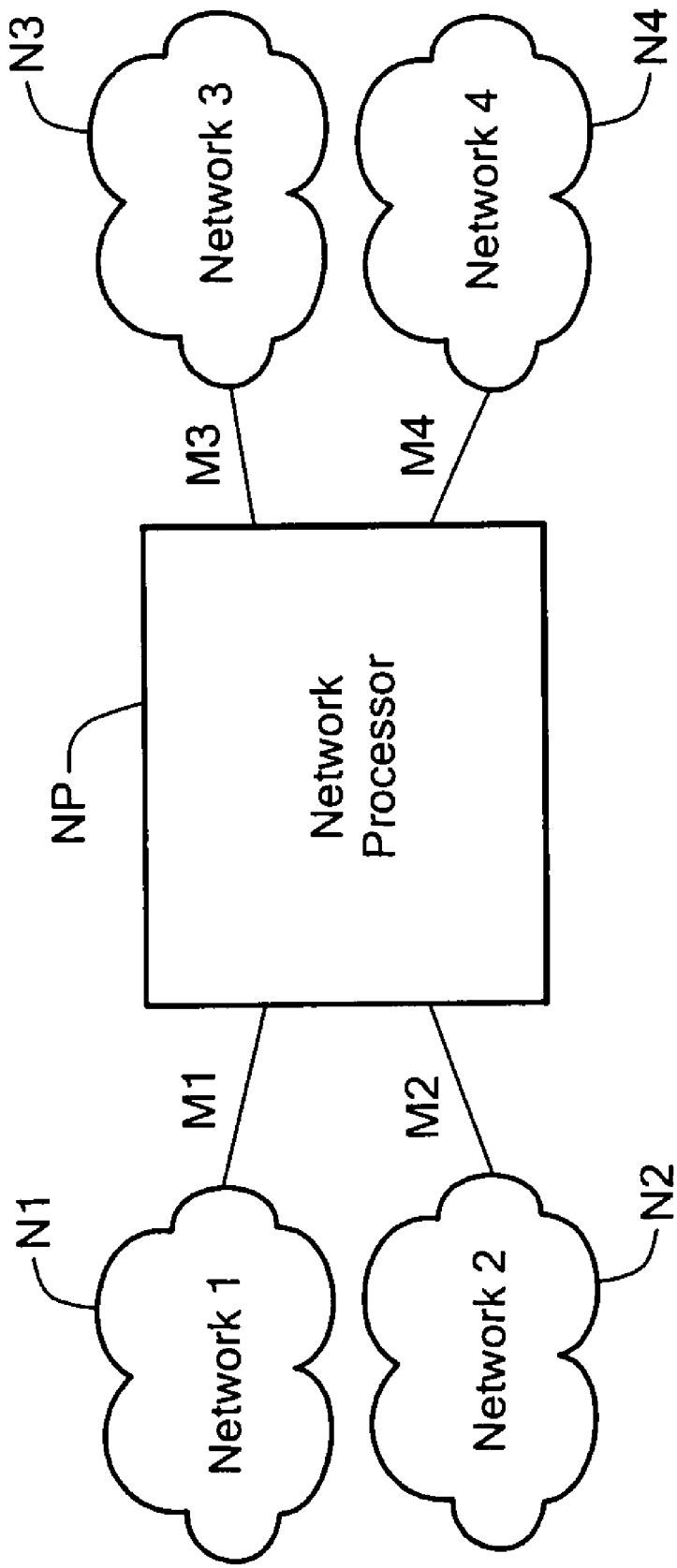
FIG. 6 is a pictorial representation of a network processor having traffic prioritization coupled to different networks.

FIG. 6 shows a network processor NP passing traffic to various networks N1, N2, N3, N4 over respective media M1, M2, M3, M4 with traffic prioritization as described below in detail. Each of the media M1, M2, M3, M4 can be the same or different with associated line rates. In general, different media will have different line rates. As described below, the network processor can prioritize traffic to minimize dropped packets due to the differential between media line rates, for example.

Figure 7:
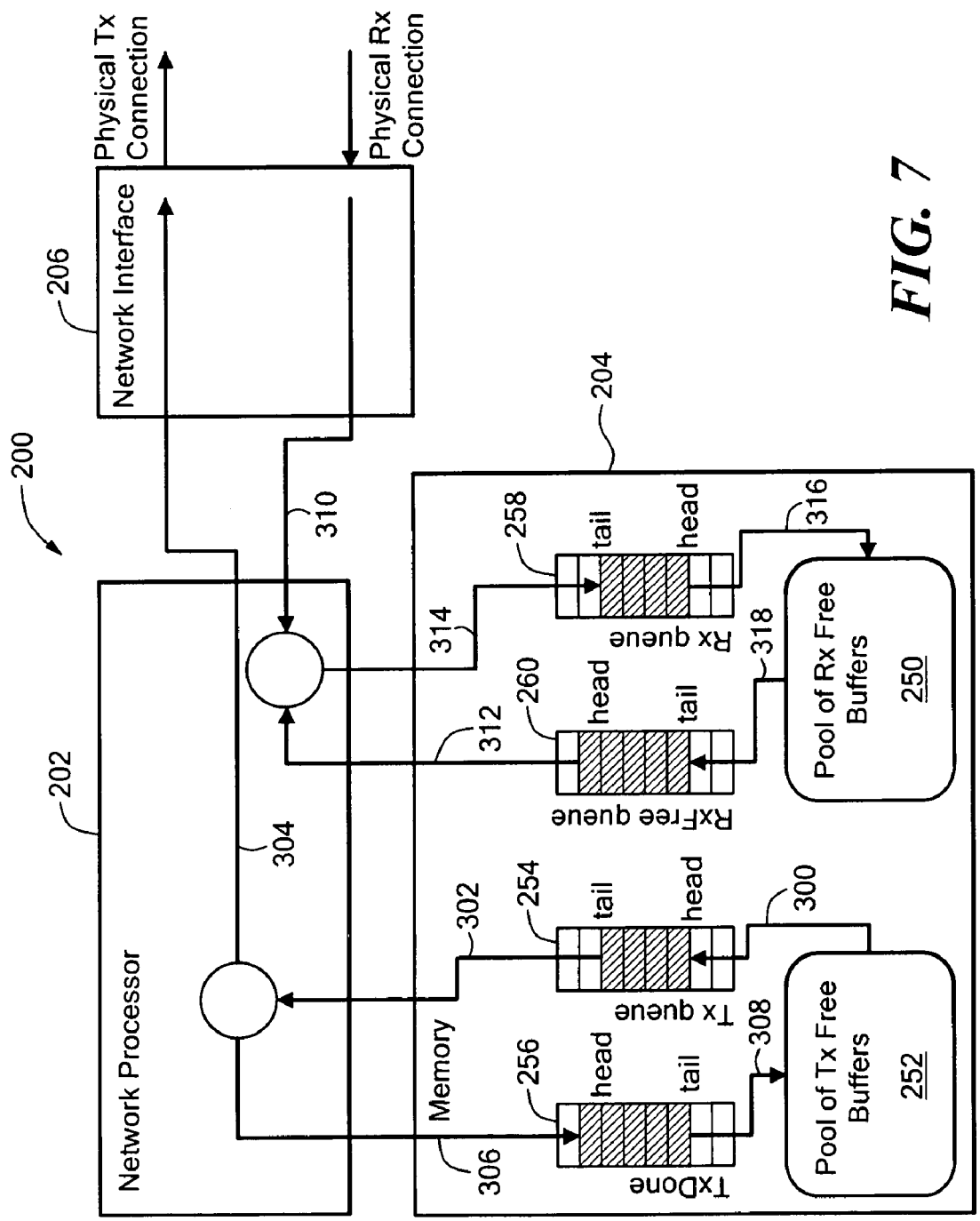
FIG. 7 is a pictorial representation of a buffer scheme to provide traffic prioritization.
Figure 7A:
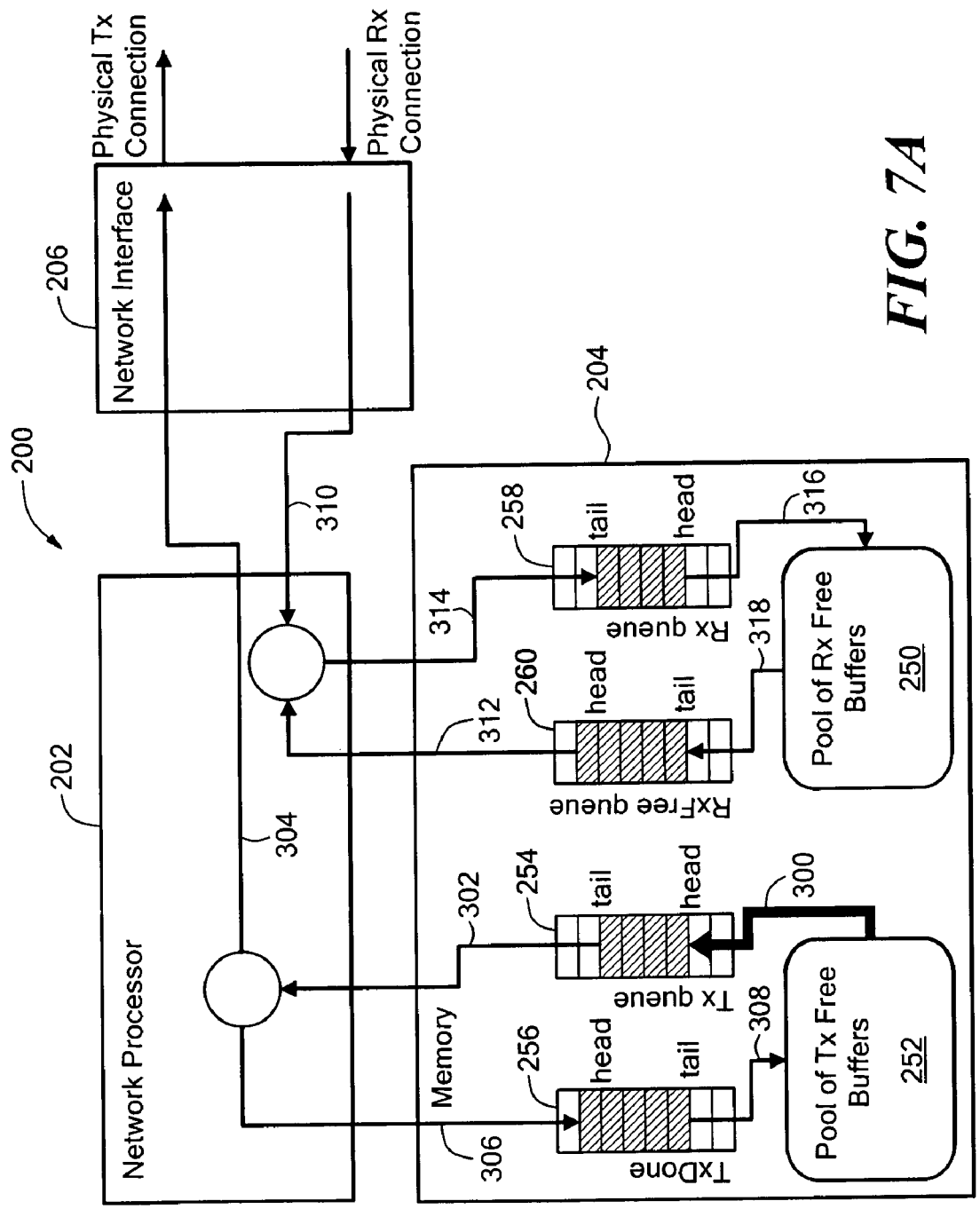
FIGS. 7A-7J, show processing stages for the buffer scheme of FIG. 7.
Figure 7B:
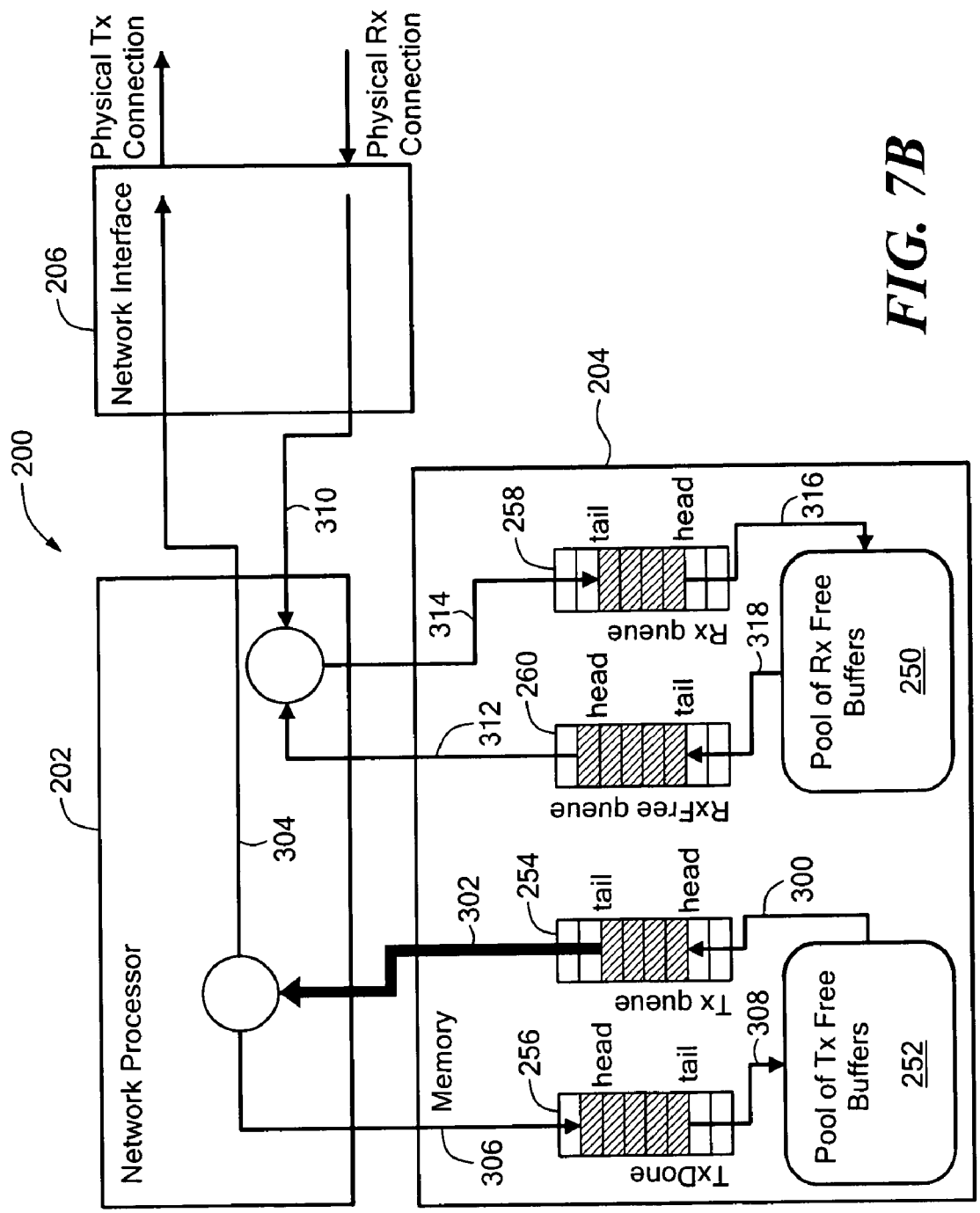

As shown in FIG. 7, an exemplary network 200 includes a network processor 202 coupled to memory 204 and to a network interface 206. The network processor 202 can be provided as the network processor of FIG. 2. The memory 204 includes a pool of free receive buffers 250 and a pool of free transmit buffers 252. Buffers from the pool of free transmit buffers 252 are assigned to a transmit queue 254 as needed. Buffers from a transmit done queue 256 are assigned to the pool of free transmit buffers after use. Similarly, a receive queue 258 and a receive free queue 260 exchange buffers with the pool of free receive buffers 250.

Figure 7C:
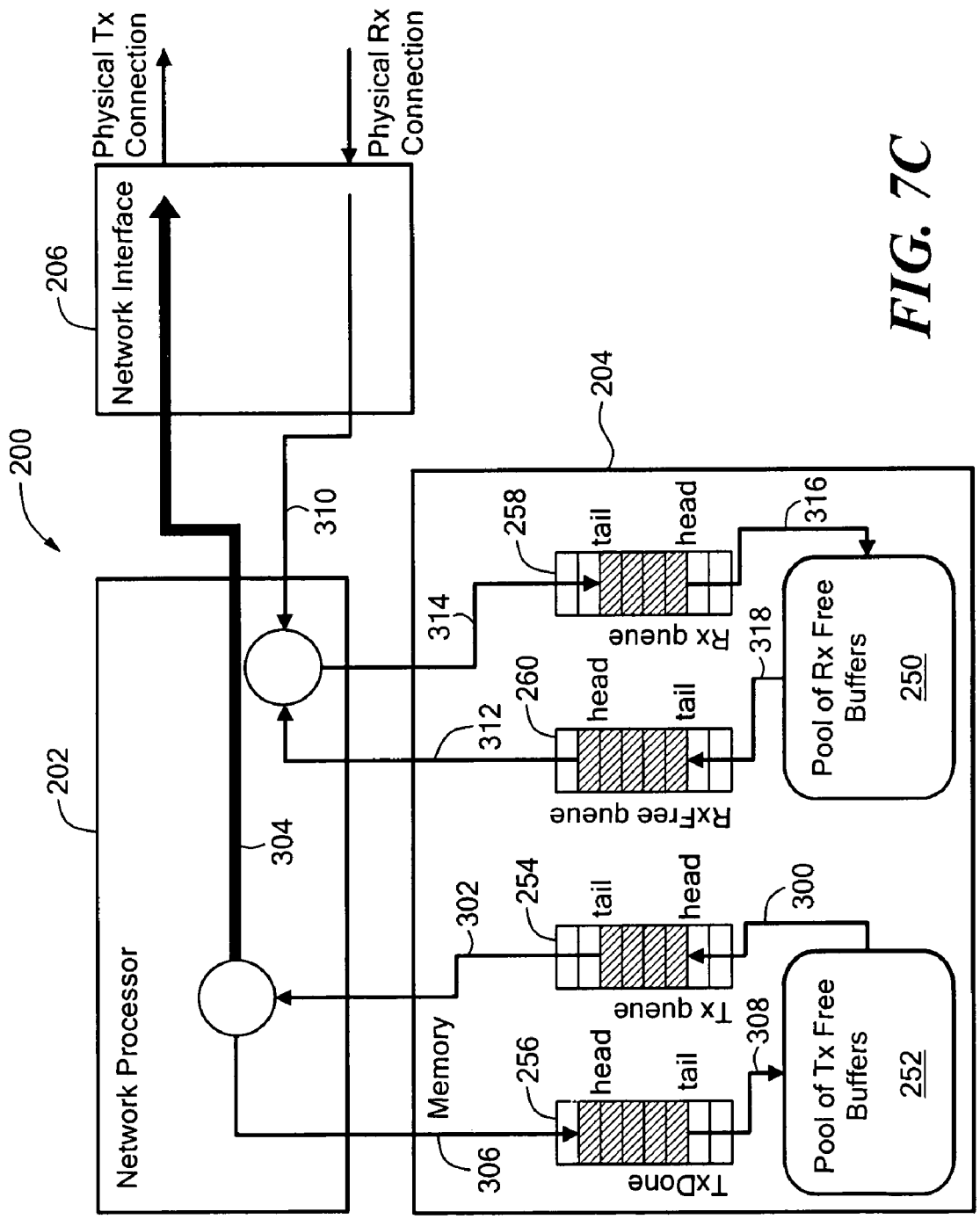
Figure 7D:
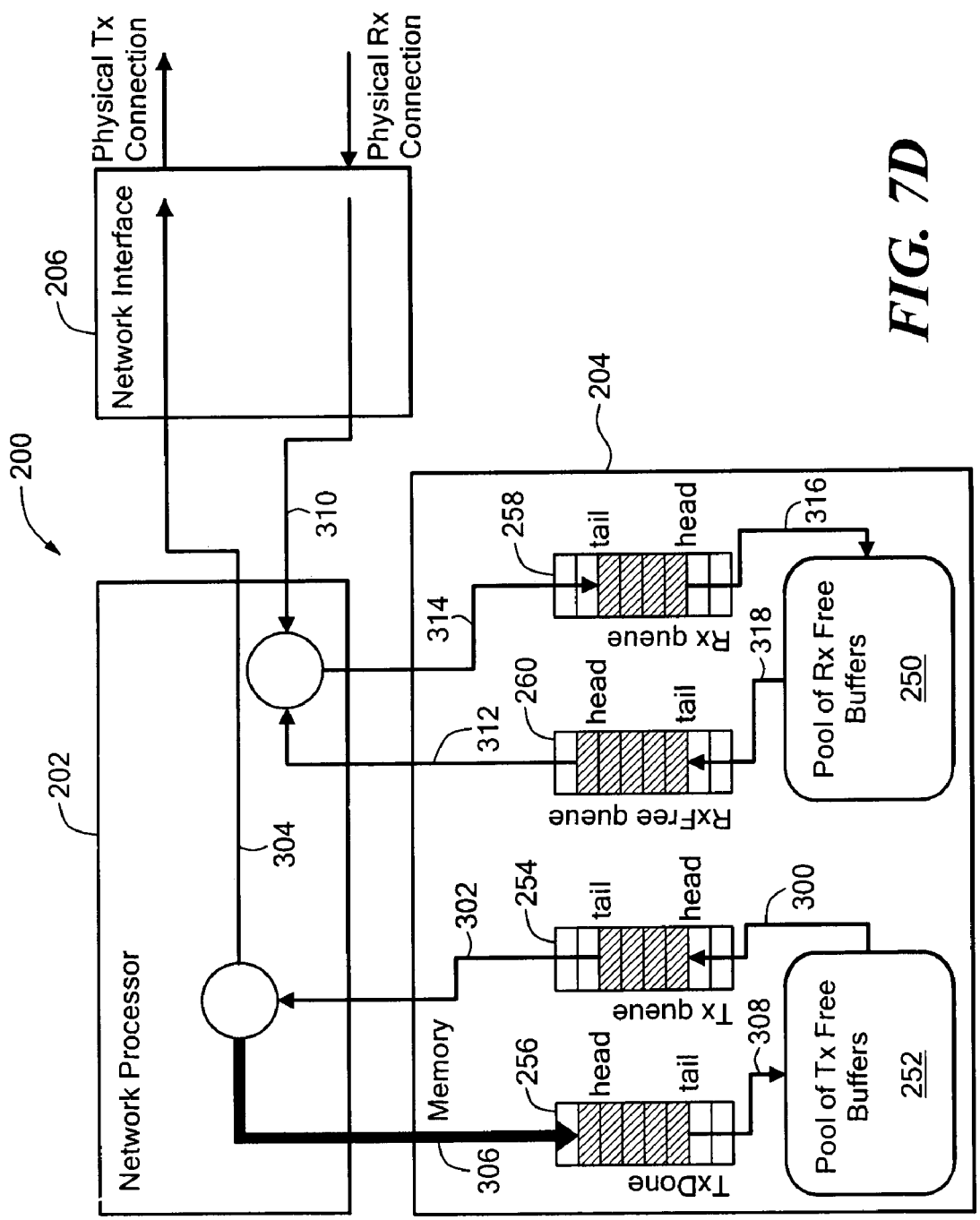
Figure 7E:
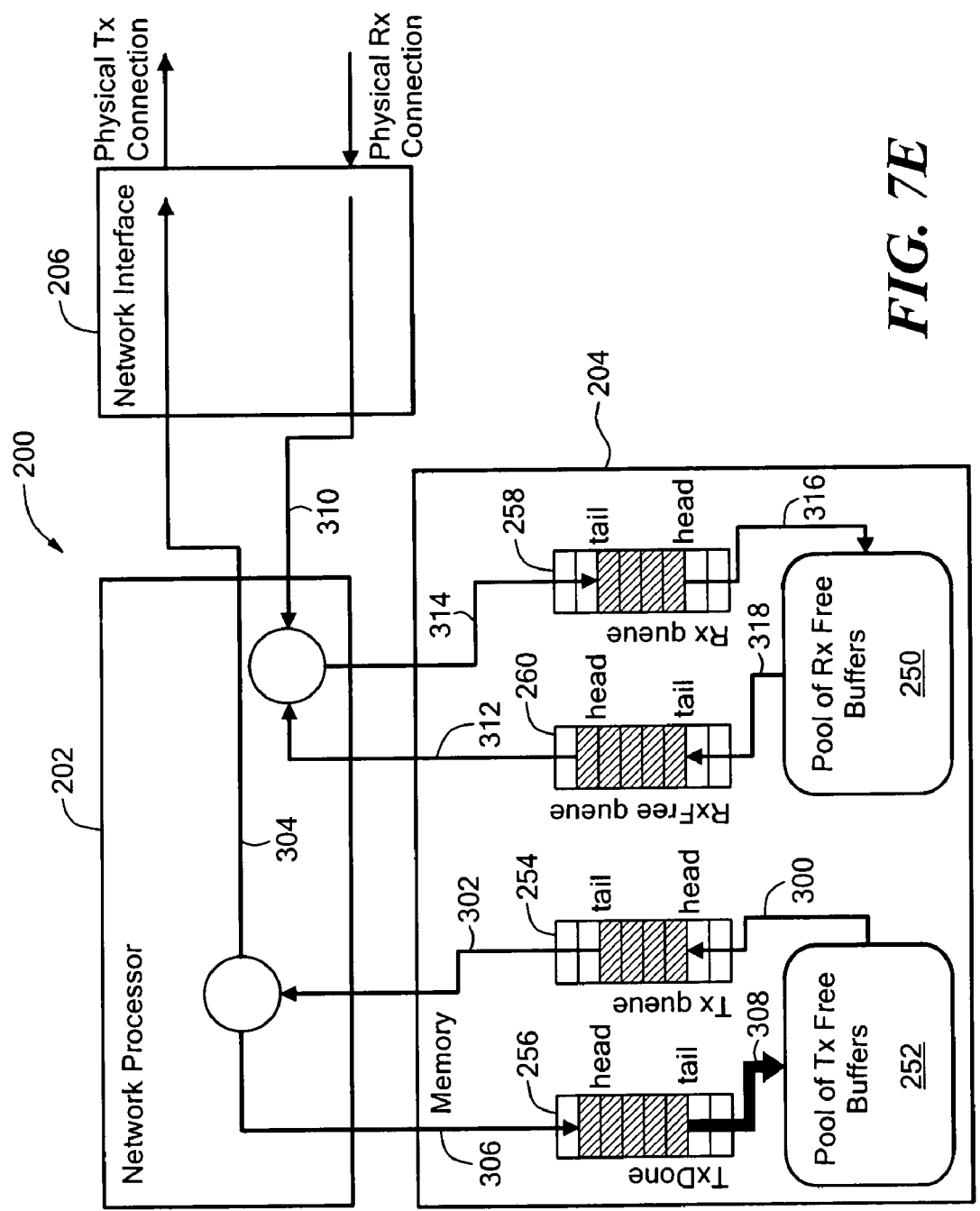

Processing stages are shown in FIGS. 7A-J. In a first processing stage 300 (FIG. 7A) the network processor 202 adds a buffer from the pool of free transmit buffers 252 to the transmit queue 254 and fills the data payload. The assigned buffer can contain data from the network interface 206 or a different network interface. Typically, the data payload is added when for a complete packet. In a second stage 302 (FIG. 7B), the network processor 202 periodically pulls one or more buffers from transmit queue 254 and sends the data in the buffer to the network interface in a third stage 304 (FIG. 7C). In a fourth stage 306 (FIG. 7D), the buffer is returned to the transmit done queue 256. In a fifth stage 308 (FIG. 7E), the transmit done queue 246 is periodically served by the network processor and buffer(s) in the queue are returned to the pool of free transmit buffers 252.

Figure 7F:
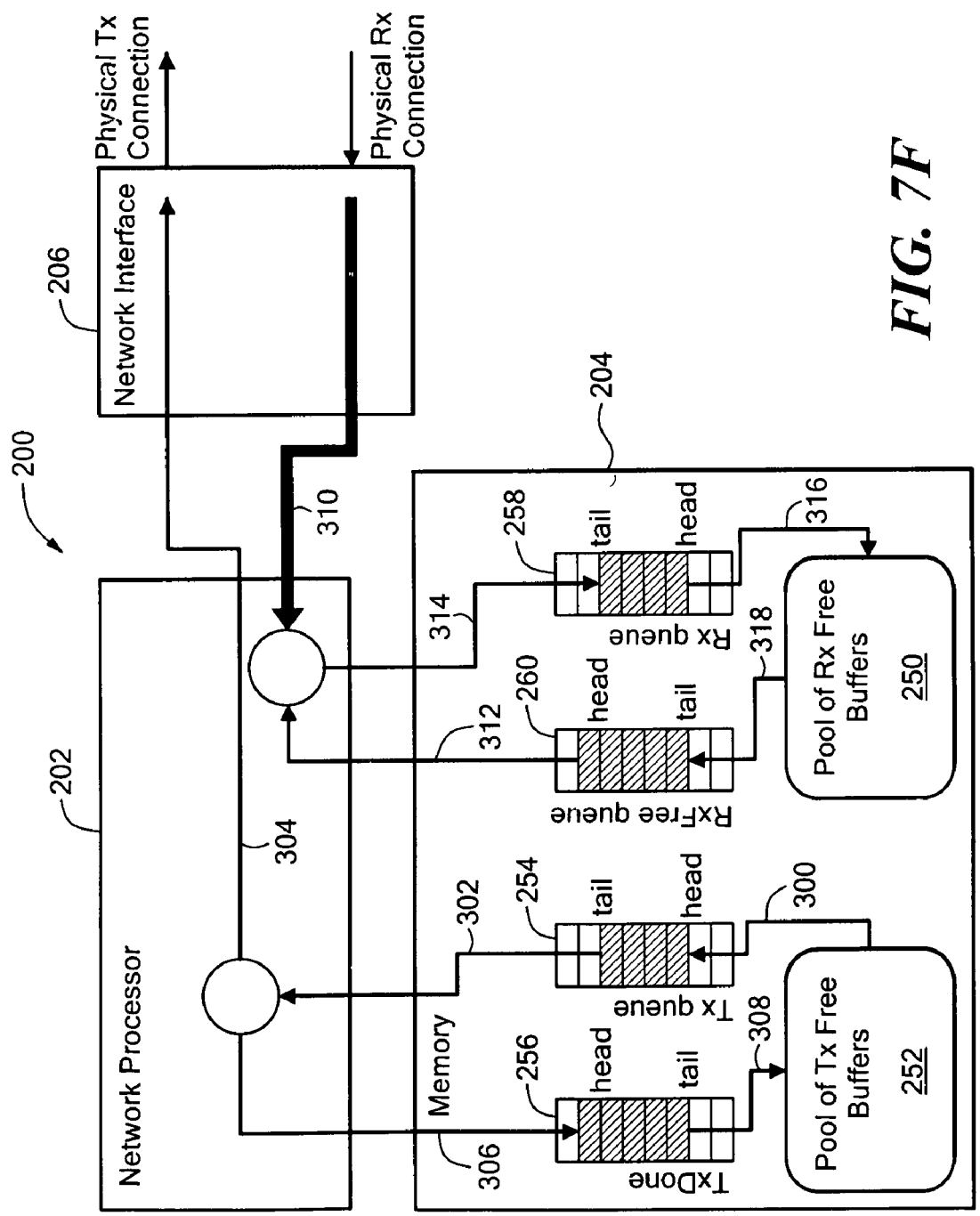

In a sixth stage 310 (FIG. 7F), the network processor 202 is notified upon receipt of a new packet and collects the data from the network interface 206. The packet is stored in the buffer (DRAM) taken from the tail of the RxFree queue (FIG. 7F). If the queue is empty, the network processor receives data from the network interface until the end of the packet, but does not stores it anywhere, so whole packet is dropped. Alternatively a new packet is stored in a small buffer (typically SRAM) and another thread is moves the packet into the buffer. In that case packets are dropped if the local buffer becomes full. When the complete packet is stored into a 'free' buffer, the handle/pointer to a buffer is then added to the tail of Rx queue.

Figure 7G:
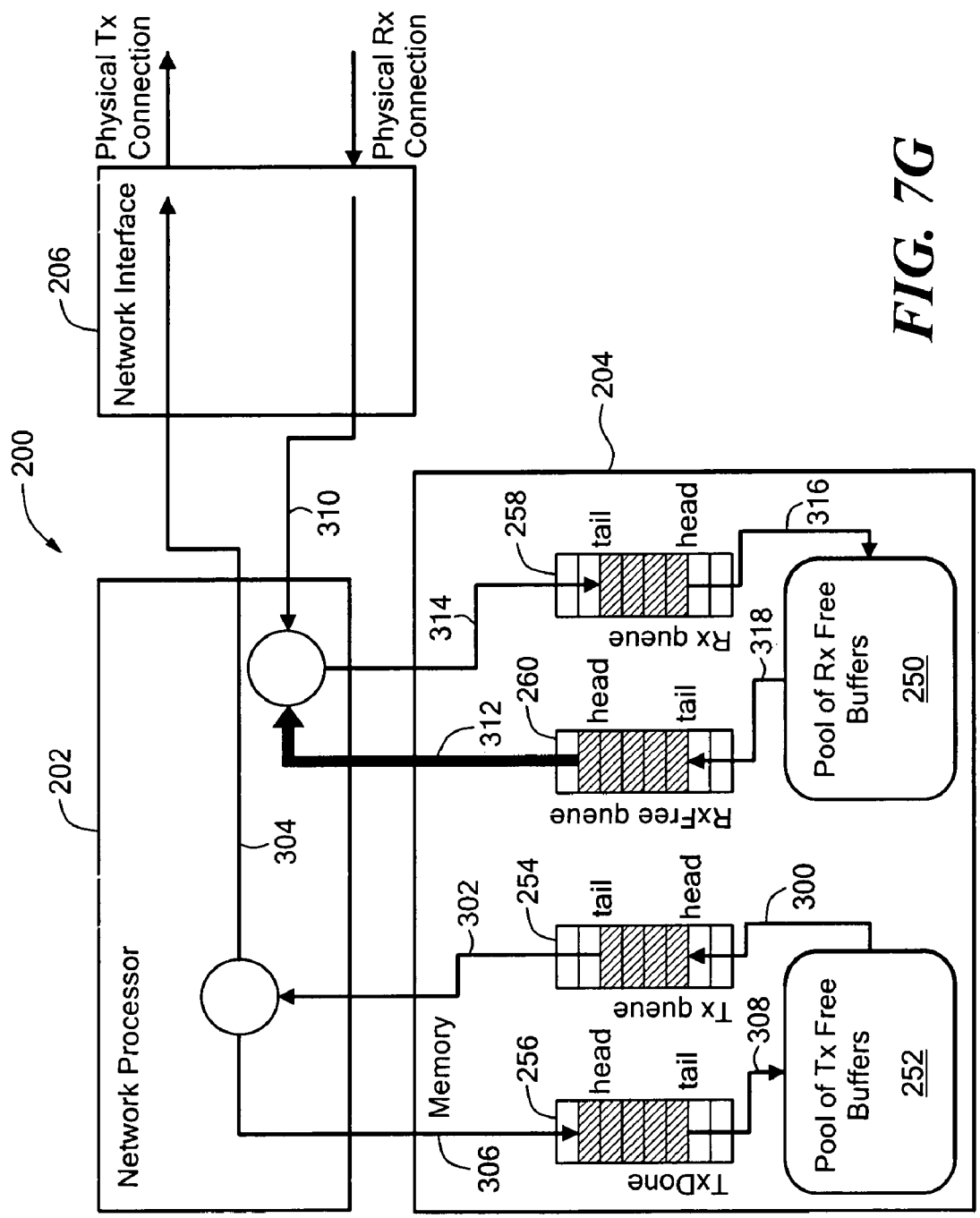
Figure 7H:
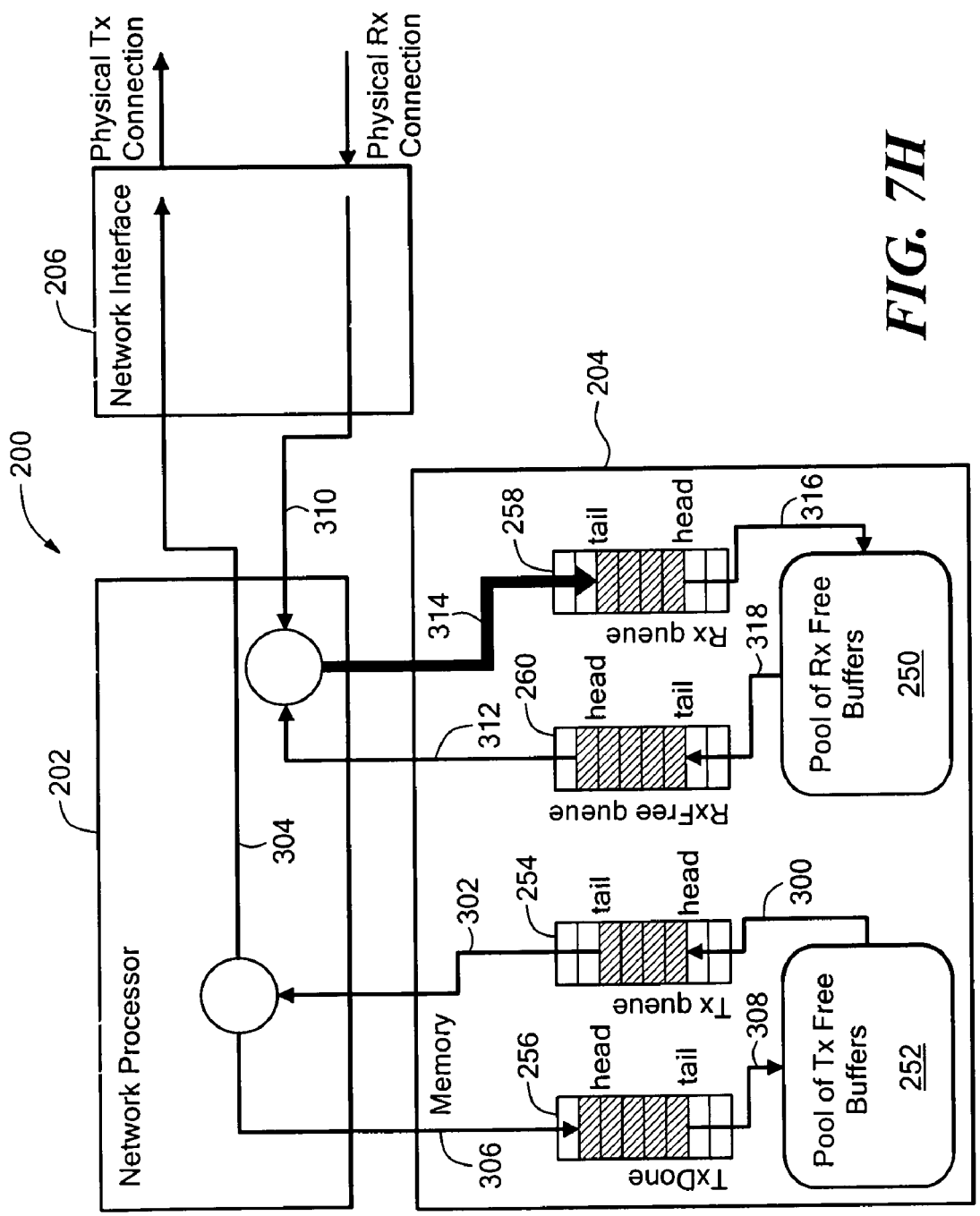
Figure 7I:
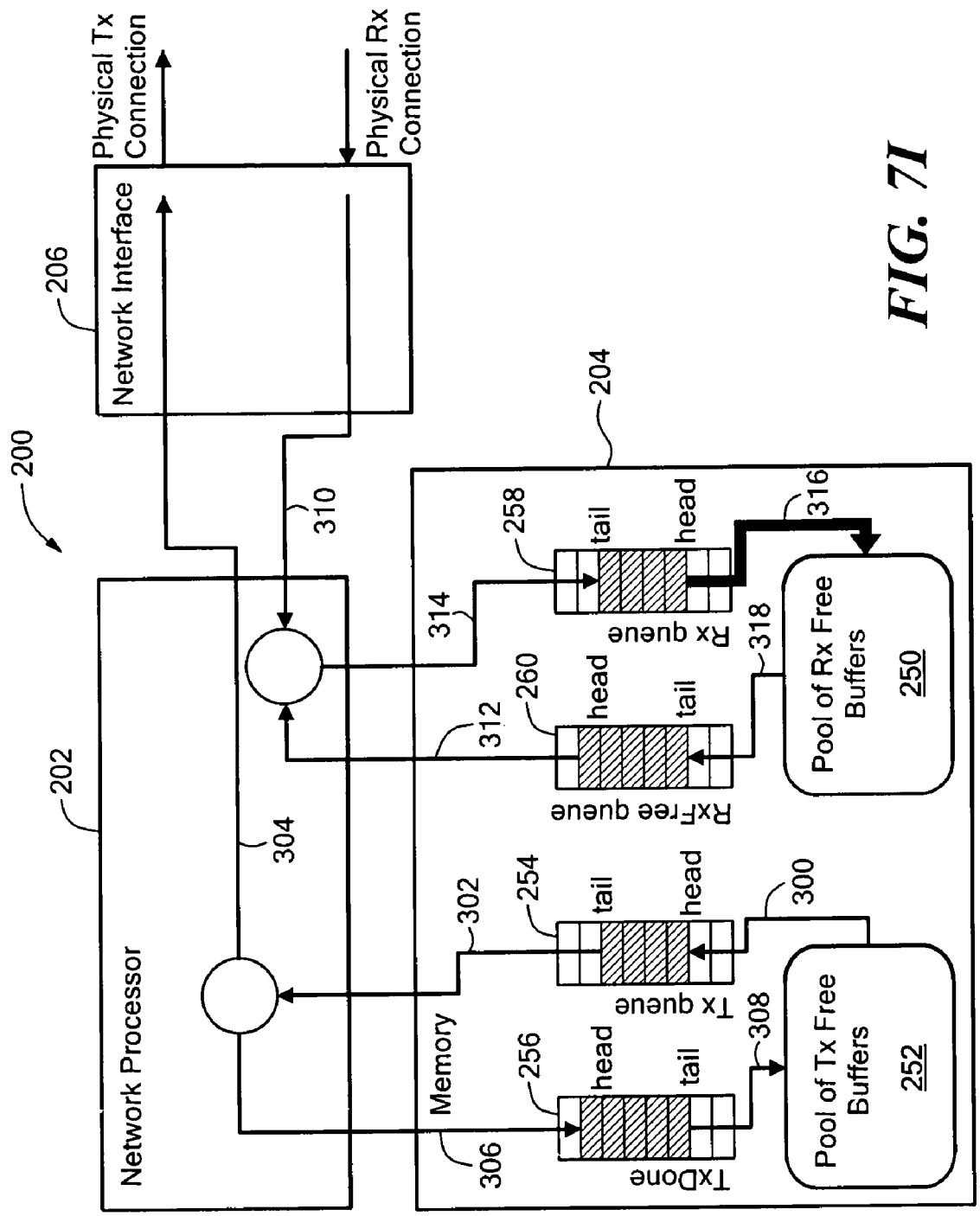
Figure 7J:
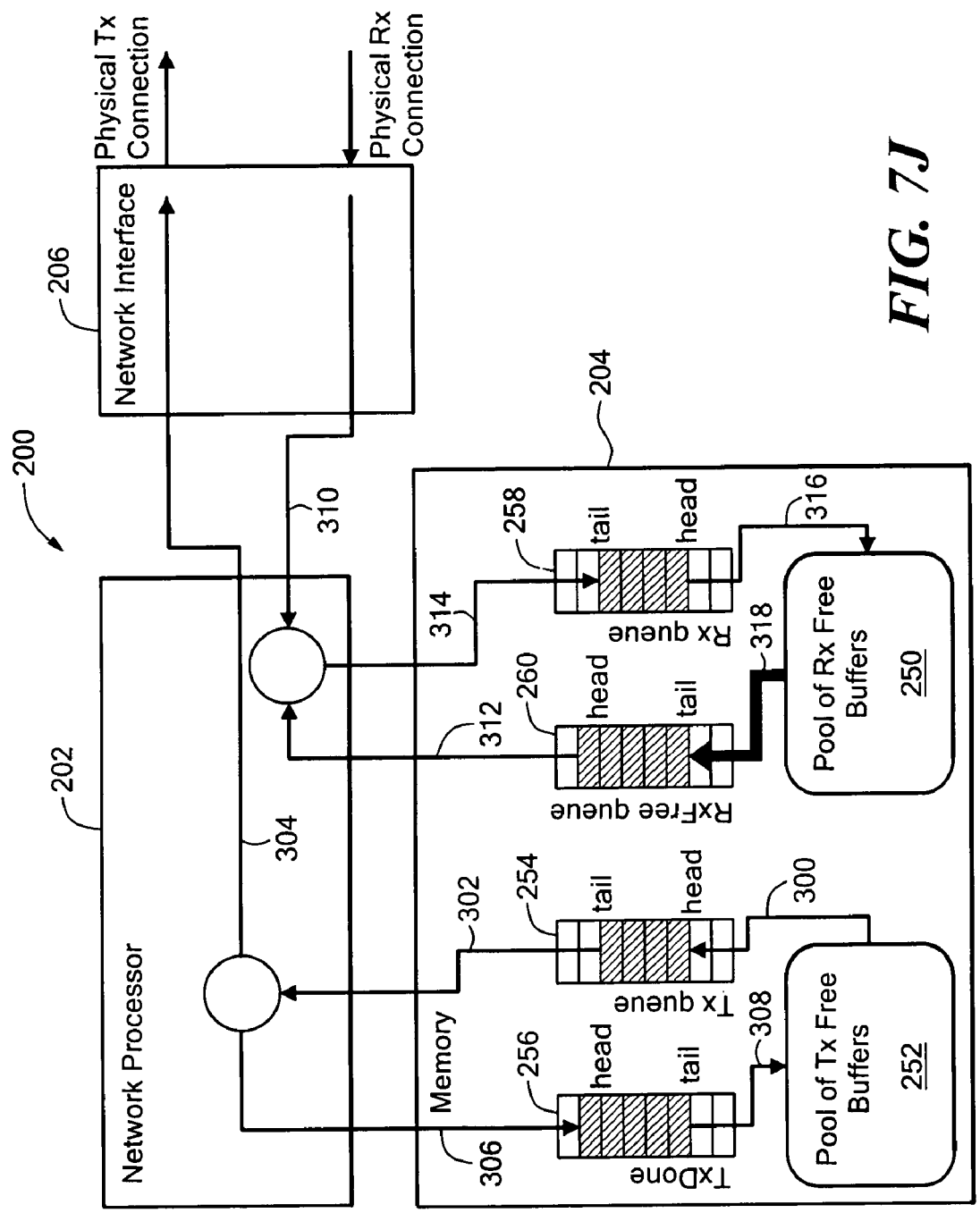

A free receive buffer is obtained from receiver free queue 260 to store the received data from network interface 206 in a seventh stage 312 (FIG. 7G). After reception of the complete packet, the receive buffer is inserted into the receive queue 258 in stage eight 314 (FIG. 7H) to await further processing of the data.

In a ninth stage 316 (FIG. 7I), the network processor 202 removes buffers from receive queue 260 when it is not empty, performs some specific tasks on the buffer (for example forwards data to another network interface) and returns buffers to the pool of free receive buffers. In a tenth stage 318 (FIG. 7J), the network processor 202 periodically adds buffers to the receiver free queue 260 from the pool of free receive buffers 250. Note that reception of new packet may not be possible if the receive free queue 260 is empty or the receive queue 258 is full. In such a case, a packet may be dropped and received data ignored.

As described above, a network processor often contains multiple processing elements cooperating together. For example, a receive path for a first processing element performs various tasks 6, 7 and 8, while a second processing element performs various tasks 9 and 10. If the second processing element is not quick enough in providing free receive buffers to the receive free queue 260 and the queue becomes empty, then the first processing element will have to drop incoming packets, even if it has enough processing power to handle all of packets.

In one aspect of the exemplary embodiments, network-specific traffic prioritization in a network processor can be provided. Assume that a first processing element in the network processor is performing tasks 2, 3, 4 and 6, 7, 8. The first processing element is periodically polling for free receive buffers and free transmit buffers. Free receive buffers are used for reception of the data from the network interface, as described above. Data from the transmit buffers is sent to the network interface. Then the receive and transmit buffers are returned to the associated queues.

The buffer polling interval, i.e., the number of times per second a processing engine checks for transmit and/or receive buffer availability, of the network processor is configurable and generally depends on the network interface data throughput, minimum size of the packets, and the number of the buffers that are loaded every polling interval. For example, a 100 Mbps Ethernet interface is capable of receiving/transmitting about 148,000 64-byte frames per second. If the processing element loads one free receive buffer and one transmit buffer every polling interval, then it needs to poll about 148,000 times per second for buffers to support line-rate data throughput. However, this number can be reduced if two or more buffers are loaded at a time.

The data throughput on different interfaces can be tuned using following parameters:
  Polling interval (usually specified in processor cycles)
  Number of free receive buffers loaded every polling interval
  Number of free transmit buffers loaded every polling interval To prioritize receive over transmit on the same Ethernet interface, one can configure the number of free receive buffers to be loaded relatively high and can configure the number of transmit buffers to be loaded relatively low with the polling interval relatively long. For example, if the polling interval will be 74,000 and the number of loaded free receive buffers configured to two but the number of loaded transmit buffers configured to one, then receive data throughput will be equal to line-rate (max) throughput, but only half of maximum transmit throughput will be achieved. With this arrangement, the processing element spends less time on transmit and more time on receive, which typically requires more complex processing.

If it is desired to prioritize one interface over another, then one can make the polling interval shorter for the prioritized interface or make the number of buffers loaded per polling interval smaller. It should be taken into account that different interfaces may have different line rate throughputs and different processing requirements.

Figure 8:
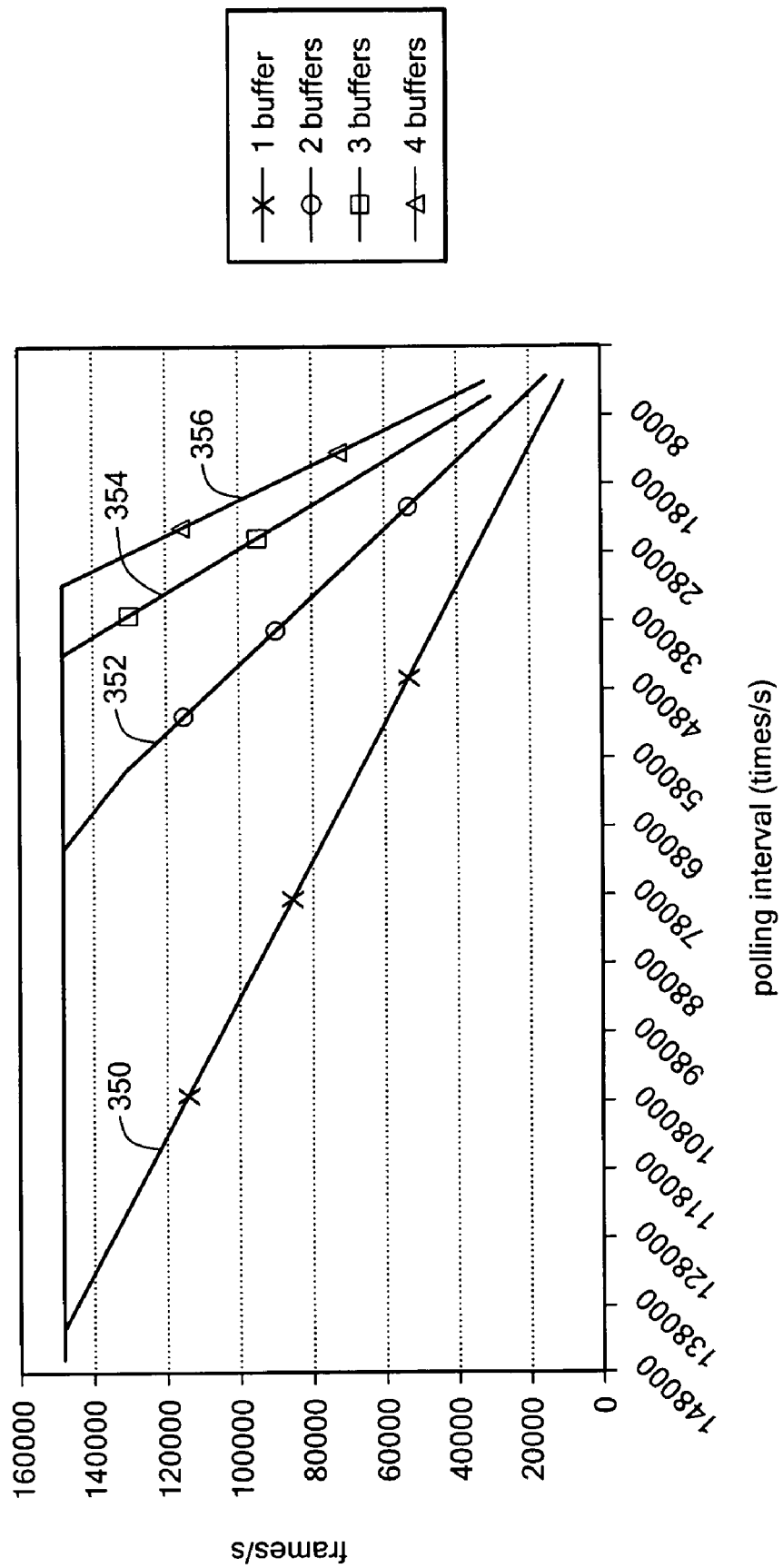
FIG. 8 is a graphical depiction of Ethernet frame throughput for different polling intervals and number of buffers loaded.

FIG. 8 shows a graphical example of how Ethernet frame throughput changes versus the polling interval and the number of buffers loaded every polling interval. Plots are shown for one buffer 350, two buffers 352, three buffers 354, and four buffers 356. If a receive path loads four buffers at a time and a transmit path loads one buffer, then transmit throughput 356 will be falling more rapidly with increases in the polling interval (blue line). Receive throughput will be constant (and maximum) for a range of polling intervals from about 148000-38000 clock cycles. As can be seen, increasing the polling interval prioritizes receive over transmit in terms of throughput.

Figure 9:
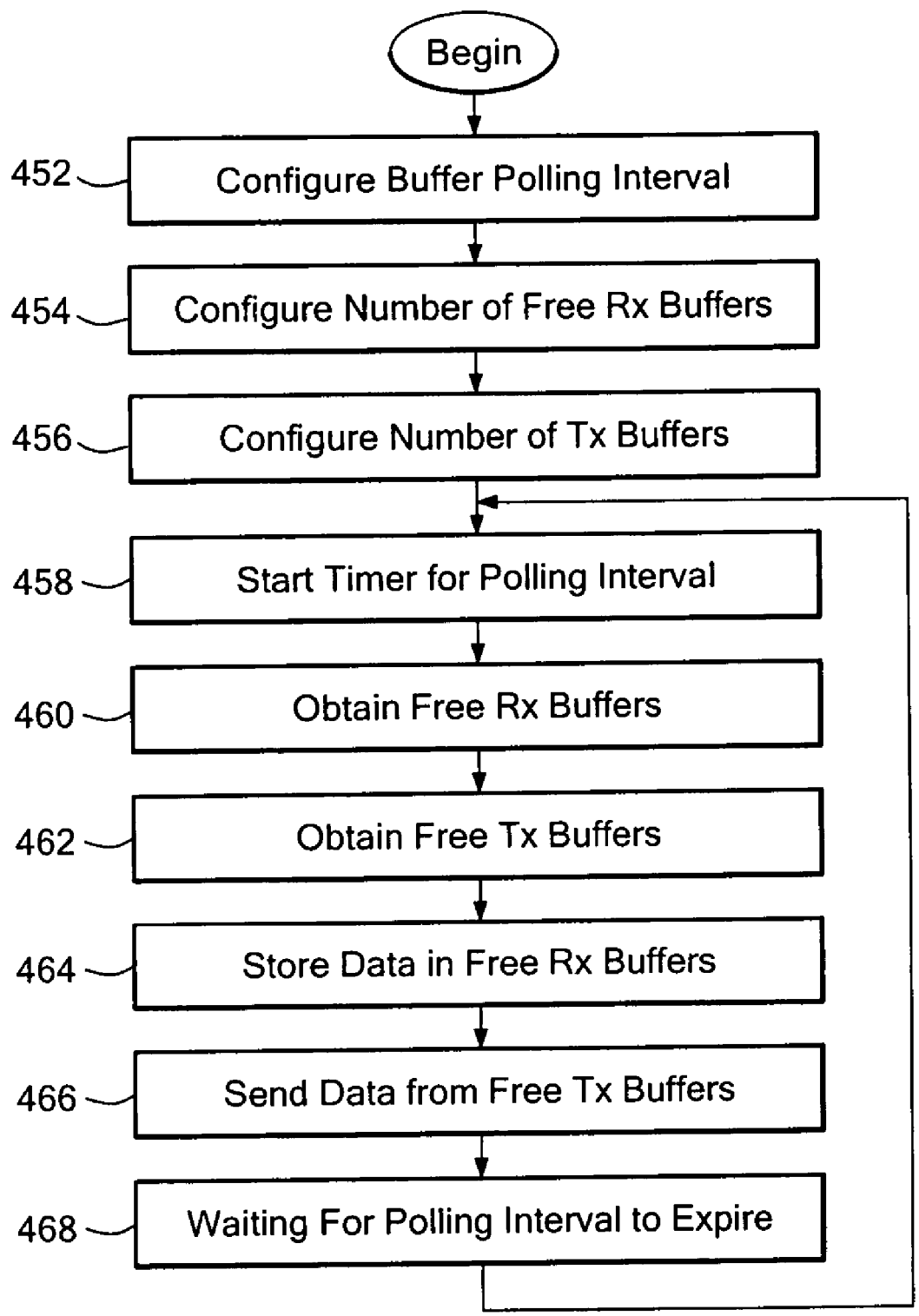
FIG. 9 is a flow diagram showing processing blocks for traffic prioritization.

FIG. 9 shows an exemplary sequence of processing blocks to implement traffic prioritization. In processing block 450, the buffer polling interval is configured for each interface the network processor is serving. In processing block 452, the number of free receive buffers is configured. The free receive buffers are obtained from the free receiver queue each polling interval. In processing block 454, the number of transmit buffers is configured. The transmit buffers are obtained from the transmit queue each polling interval.

The timer or counter measuring polling interval is started in processing block 456. In processing 458, the designated number (in processing block 452) of free receive buffers are obtained from the free receiver queue. In processing block 460, the designated number (in processing block 454) of transmit buffers are obtained from the transmit queue.

In processing block 462, the incoming traffic is stored in the obtained free receive buffers. Data is sent from the transmit buffers in processing block 464. In processing block 466, after the timer or counter measuring polling interval expires, processing continues in processing block 456.

With this arrangement, the throughputs on different interfaces can be tuned. In addition, receive and transmit can be tuned in a predictable way. Further, configuration parameters, such as polling interval can be dynamically modified.

Dynamic reconfiguration may be useful in various situations. For example, if more processing or memory bandwidth is needed temporarily for particular task, polling intervals for various interfaces can be increased, which will partially offload processor/memory from handling network traffic. Also, if two or more interfaces are bridged (network data is exchanged between them) and processing of packets from one interface consumes an excessive amount of processing time, leaving relatively little processing time for the other interface, then limiting number of packets received on the first interface improve overall data throughput (less packets will be dropped due to insufficient processing power).

Figure 10:
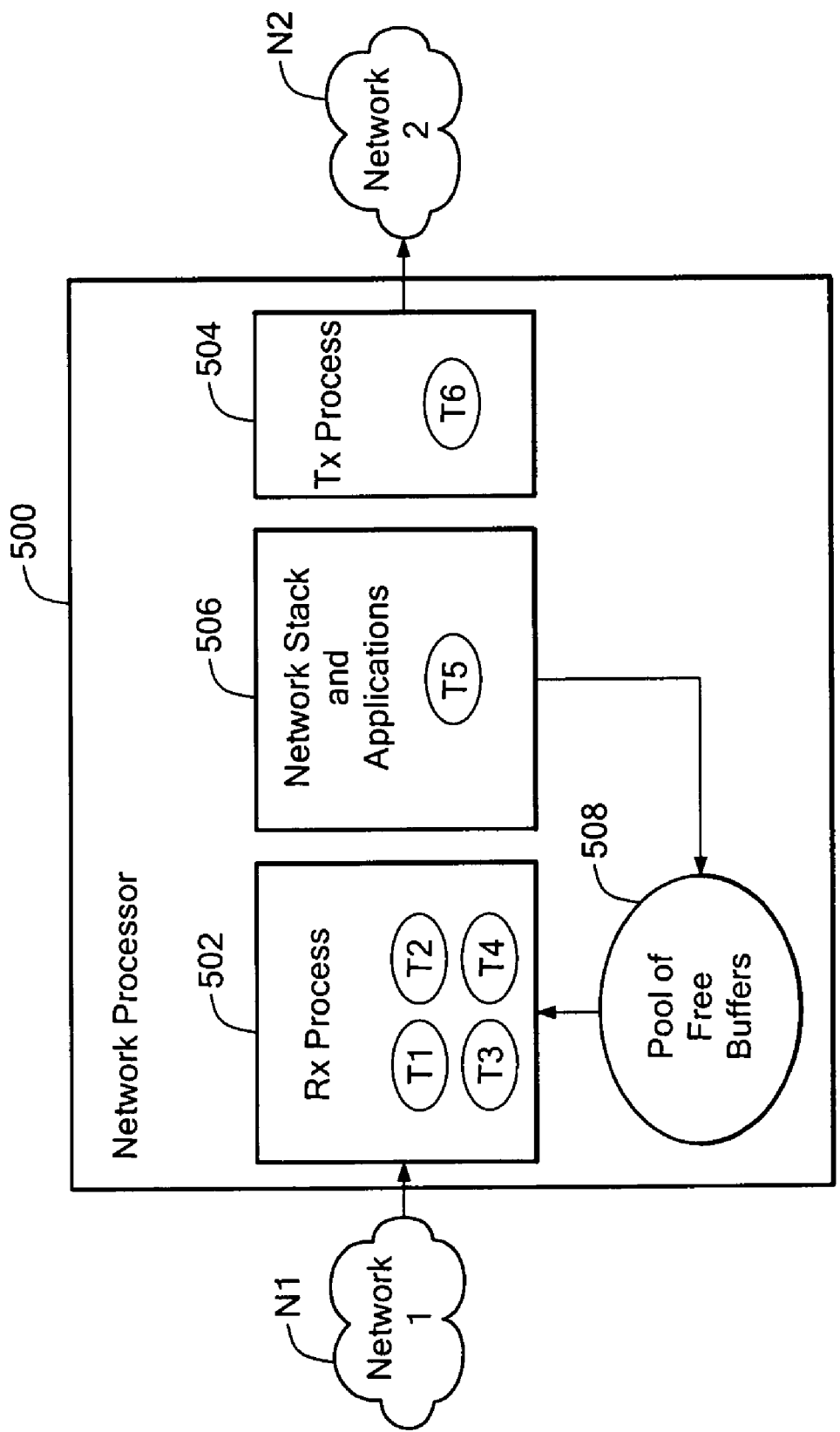
FIG. 10 is a pictorial representation of a network processor having traffic prioritization coupled to a number of networks.

FIG. 10 provides some additional detail on packet processing with 'efficient' packet dropping. A network processor 500 passes data between first and second networks N1, N2. The network processor 500 includes a receive process 502 for the first network N1 and a transmit process 504 for the second network N2. The network processor 500 further includes a process for the network stack and software applications 506. A pool of buffers 508 provides buffers to the receive process 502. After use, the network stack and applications process 506 returns buffers to the pool of free buffers 508.

The receive process 502 can include various low level tasks, such as tasks T1, T2, T3, T4, to receive packets from particular media, extract data from packets using a particular protocol, and insert data into buffers. A fifth task T5 can be performed by the network stack and application process 506. A sixth task T6 can be performed by the transmit process 504 to build and transmit packets on particular media.

Packet reception can be divided into the following stages:
New packet is signaled by the interface connected to the media.
Whole or part of packet is stored in a local memory.
A free buffer is taken from the pool of free buffers (if available) and the packet is stored in a free buffer. If free buffer is not available, whole packet is dropped.
A buffer with the data from the packet is passed to a network stack.
Network stack performs variety of actions (usually most of the NP processing is spent there) and passes the buffer(s) to another task for transmission to another network.
A data stored in the buffer is encapsulated into a packet according to the protocol used in the corresponding network and packet is sent through the interface attached to this network.

A packet received from the first network N1 is processed first by the receive process 502 handling the first network, and then passed to the stack 506 and subsequently to the transmit process 504 handling the second network N2. Any of the processes can drop packets due to various reasons. When packets are dropped by the network stack 506 or transmit process, significant processing time is wasted. It is more efficient to drop these packets in the receive process 502.

In general, packet-processing software in a network processor, for example, is modularized. So called low-level modules in the receive and transmit processes 502, 504 receive or transmit, respectively, from/to interfaces like Ethernet, HSS (High Speed Serial Port), which handles E1/T1 traffic, Asynchronous Transfer Mode (ATM) (e.g., Utopia) etc., and high level stack/application functionality, such as TCP/IP stack, routing, bridging etc.

In general, as used herein high-level functions are more complex and consume more processing time than low-level functions. In exemplary embodiments, network traffic prioritization is implemented in low-evel modules handling traffic on different interfaces, since it is more efficient to identify and drop packets that will likely be dropped instead of consuming processor cycles on packets that end up being dropped after processing. High-level functions require more processing power for packet processing functionality, such as by the TCP/IP stack.

Generally, low-level modules use buffers to store network packets and pass them to a high level functions, as shown and described above. One way to throttle traffic on any interface is to stop delivering buffers to the module handling the interface. Alternatively, the module can lower the rate at which it consumes buffers. This causes the module to drop some of the incoming network packets, but by doing so processing cycles that would be consumed by the module and high level functions to process the packet are saved.

The exemplary scheme can be extended by defining not only how frequently a low level module consume buffers, but also how many buffers it can retrieve. This increases the efficiency of buffer handling and when a particular interface is throttled it allows for bursts of packets from time to time to be processed (which is more efficient from network stack and the TCP protocol point of view).

Figure 11:
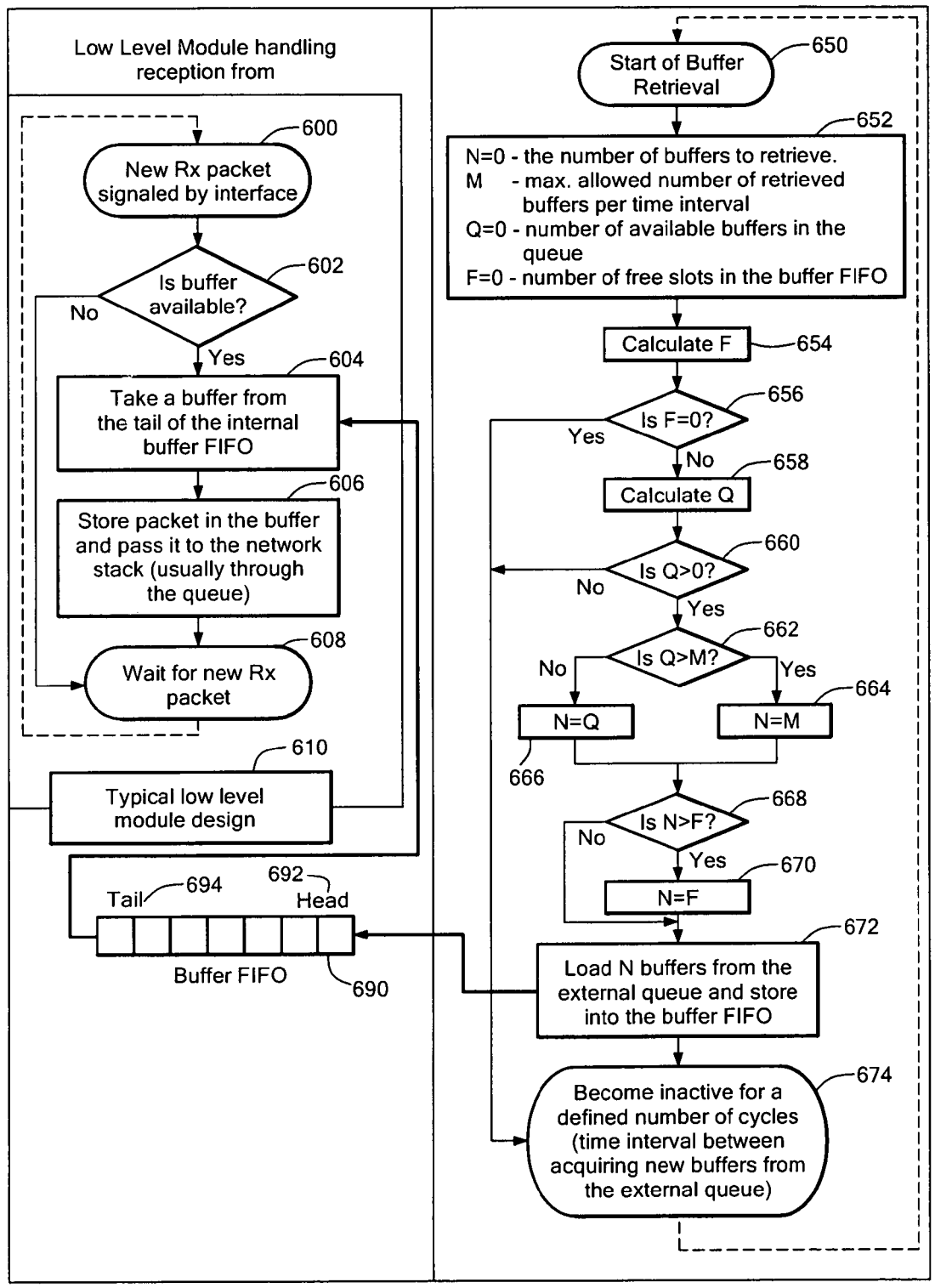
FIG. 11 is a flow diagram showing exemplary an buffer retrieval process.

FIG. 11 shows an exemplary processing sequence implementing traffic prioritization. Processing blocks 600-610 show a low-level module handling reception from a single network interface. Processing blocks 650-674 show a separate and parallel process of acquiring new buffers from the external queue. A buffer FIFO 690 is shown having a head pointer 692 and a tail pointer 694. As described more fully below, the maximum number of buffers M to be retrieved during single execution and time interval are set externally and arbitrarily by the controlling process. Prioritization of one interface over another (or transmission over reception on single interface) requires that low-level modules handling network packets can use the illustrated buffer retrieval process. The time interval between acquiring new buffers from the external queue and the maximum number of buffers to be retrieved per iteration can set once permanently or can be varied over time, dependently on application needs.

In processing block 600, the presence of a newly received packet is signaled by a receive interface and in processing block 602 it is determined whether a buffer to store data is available. If not, in processing block 608, the module awaits the reception of another packet. If so, in processing block 604, a buffer is taken using the tail pointer 694 for the buffer FIFO.

In processing block 606, the packet is stored in the obtained buffer and passed to the network stack, typically through a queue. Processing continues in block 608 as the module awaits arrival of the next packet.

In parallel with the packet handling module, new buffers are acquired while prioritizing traffic. In processing block 650, buffer retrieval is initiated. In processing block 652, parameters are initialized. The number of buffers N to retrieve is set to zero, the maximum allowed number M of retrieved buffers per time interval is set, the number Q of available buffers in the queue is set to zero, and the number F of free slots in the buffer FIFO 690 is set to zero.

processing block 654, the number F of free slots in the buffer FIFO 690 is computed. In processing block 656 it is determined whether the number F of free slots is zero, i.e., whether there are any available buffers. If the number F is zero (no available buffers), then processing continues in processing block 674 where processing becomes inactive for a number of cycles corresponding to the time interval between acquiring new buffers from an external queue. If buffers are available (F does not equal zero), then in processing block 658, the number Q of available buffers in the queue is computed. It is then determined in processing block 670 whether the number Q of available buffers is greater than zero (Q>0?). If not, then processing continues in processing block 674. If buffers are available in the queue, then in processing block 662, it is determined whether the number Q of available buffers in the queue is greater than the maximum allowed number M of retrieved buffers per time interval (Q>M?). If not, then in processing block 664, the number N of buffers to retrieve is set to equal the maximum allowed number M of retrieved buffers per time interval. If not, then in processing block 666, the number N of buffers to retrieve is set to equal the maximum allowed number M of retrieved buffers per time interval.

Processing continues in processing block 668 where it is determined whether the number N of buffers to retrieve is greater than the number F of free slots in the buffer FIFO 690 (N>F?). If so, then the number N of buffers to retrieve is set to equal the number F of free slots in the buffer FIFO 690 and processing continues in processing block 672, which is also where processing continues from block 668 if the number N of buffers to retrieve was not greater than the number F of free slots in the buffer FIFO 690. In processing block 672, the number N of buffers to retrieve determines the number of buffers loaded from the external queue and stored in the buffer FIFO 690. Processing then continues in processing block 674 where processing becomes inactive for a time corresponding to the number of cycles based upon the time interval between buffers from the external queue.

The embodiments described above allow more efficient use of network processor processing time. For example, sometimes a significant amount of processor cycles are used for processing packets, which are later on discarded because of network interface bandwidth limitations or other reason. It is more efficient to discard such packets at the beginning of the processing pipeline. This can be achieved by limiting receive throughputs, as described above. In addition, it can be done dynamically depending upon the processor load. By avoiding processing of packets that will be dropped, overall data throughput is enhanced.

While illustrative network traffic prioritization embodiments are shown and described in conjunction with specific examples of a network processor and a device incorporating network processors, it is understood that the techniques may be implemented in a variety of architectures including network processors and network devices having designs other than those shown. Additionally, the techniques may be used in a wide variety of network devices (e.g., a router, switch, bridge, hub, traffic generator, and so forth). It is further understood that the term circuitry as used herein includes hardwired circuitry, digital circuitry, analog circuitry, programmable circuitry, and so forth. The programmable circuitry may operate on computer programs.

Other embodiments are within the scope of the following claims.

What is claimed is:

1. A method of prioritizing data traffic, comprising:
controlling a number of data buffers allocated per predetermined time interval for each of first and second data flows to prioritize the first data flow over the second data flow, the controlling comprising:
configuring a buffer polling interval, a number of free receive buffers to load and a number of transmit buffers to load;
measuring the polling interval;
obtaining the number of free receive buffers and the number of free transmit buffers;
storing incoming traffic in the free receive buffers; and
sending data from the free transmit buffers.

2. The method according to claim 1 wherein configuring a buffer polling interval comprises configuring a buffer polling interval for interfaces serviced by a processor.

3. The method according to claim 1, wherein obtaining the number of free receive buffers comprises obtaining the number of free receive buffers from a free receive queue.

4. The method according to claim 1 wherein obtaining the number of free transmit buffers comprises obtaining the number of free transmit buffers from a transmit queue.

5. The method according to claim 1 wherein to prioritize the first data flow over the second data flow comprises prioritizing receive data throughput over a transmit data throughput by configuring a greater number o the free receive buffers than free transmit buffers.

6. The method according to claim 1 wherein the controlling further comprises selecting the polling interval to drop packets that may be dropped after processing.

7. The method according to claim 1 wherein to prioritize the first data flow over the second data flow comprises prioritizing a transmit data throughput over a receive data throughput by configuring a greater number of the free transmit buffers than free receive buffers.

8. The method according to claim 1, wherein the buffer polling interval includes a first polling interval for a first interface, and shortening the first polling interval to prioritize traffic through the first interface.

9. The method of claim 1 wherein measuring the buffer polling interval comprises using one of a counter or a timer to measure the buffer polling interval.

10. An article, comprising:
a computer-readable medium that stores executable instructions, the instructions causing a processor to:
control a number of data buffers allocated per predetermined time interval for each of first and second data flows to prioritize the first data flow over the second data flow, the instructions causing the machine to control comprising instructions causing a machine to:

configure a buffer polling interval, a number of free receive buffers to load and a number of transmit buffer to load;

obtaining the number of free receive buffers and the number of free transmit buffers;

store incoming traffic in the free receive buffers; and send data from the free transmit buffers.

11. The article according to claim 10, wherein the instructions causing processor to control comprises instructions to prioritize the first the first data flow by configuring the number of free receive buffers to load to be different than the number of free transmit buffers to load.

12. The article according to claim 10, further comprising instructions causing processor to select the buffer polling interval to drop packets that may be dropped after processing.

13. The article according to claim 10, further comprises instructions causing a processor to select a number of free receive buffers and a number of free transmit buffers allocated for the predetermined time interval to provide greater receive throughput than transmit throughput.

14. A network forwarding device, comprising:

at least one line card to forward data to ports of a switching fabric;

the at least one line card including a network processor having multi-threaded processing elements configured to execute stored microcode instructions to control a number of data buffers allocated per predetermined time interval for each of first and second data flows to prioritize the first data flow over the second data flow, the instructions to control comprising instructions to:

configure a buffer polling interval, a number of free receive buffers to load and a number of transmit buffers to load;

obtain the number of free receive buffers and the number of free transmit buffers;

store incoming traffic in the free receive buffers; and send data from the transmit buffers.

15. The device according to claim 14 wherein instructions to configure the buffer polling interval comprises instructions to configure a buffer polling interval for interfaces serviced by a processor.

16. The device according to claim 15 wherein to prioritize the first data flow over the second data flow comprises prioritizing a receive data throughput over a transmit data throughput by configuring a greater number of free receive buffers than free transmit buffers.

17. The device according to claim 15 wherein to prioritize the first data flow over the second data flow comprises prioritizing a transmit data thoughput over a receive data throughput by configuring a greater number of the free transmit buffers than free receive buffer.

18. The device according to claim 15 wherein instructions to control further comprises instructions to select the buffer polling interval to drop packets that may be dropped after processing.

19. The device according to claim 14 wherein the buffer polling interval includes a first polling interval for a first interface, and wherein the instructions to control further comprises instructions to shorten the first polling interval prioritize traffic through the first interface.

20. A method of prioritizing data traffic between a receive data throughput and a transmit data throughput, comprising:

configuring a buffer polling interval, a number of free receive buffers to load and a number of transmit buffers to load;

obtaining the number of free receive buffers from a receive queue and the number of free transmit buffers from a transmit queue;

storing incoming traffic in the free receive buffers; and sending data from the free transmit buffers.

21. The method of claim 20 wherein to prioritize the first data flow over the second data flow comprises prioritizing a receive data throughput over a transmit data throughput by configuring a greater number of the free receive buffers than free transmit buffers.

22. The method of claim 20 wherein to prioritize the first data flow over the second data flow comprises prioritizing a transmit data throughput over a receive data throughput by configuring a greater number of the free transmit buffers than free receive buffers.

23. The method of claim 20 wherein the polling interval includes a first polling interval for a first interface, and shortening the first polling interval to prioritize traffic through the first interface.

* * * * *

UNITED STATES PATENT AND TRADEMARK OFFICE
CERTIFICATE OF CORRECTION

PATENT NO.        : 7,483,377 B2
APPLICATION NO.   : 11/069110
DATED             : January 27, 2009
INVENTOR(S)       : Lech Szumilas It is certified that error appears in the above-identified patent and that said Letters Patent is hereby corrected as shown below:

In column 12, line 25, in Claim 1, after "the" insert -- buffer --.

In column 12, line 33, in Claim 3, after "claim 1" delete ",".

In column 12, line 42, in Claim 5, before "receive" insert -- a --.

In column 12, line 43, in Claim 5, delete "o" and insert -- of --, therefor.

In column 13, line 2, in Claim 10, delete "buffer" and insert -- buffers --, therefor.

In column 13, line 4, in Claim 10, delete "obtaining" and insert -- obtain --, therefor.

In column 13, line 8, in Claim 11, after "claim 10" delete ",".

In column 13, line 10, in Claim 11, after "prioritize the first" delete "the first".

In column 13, line 16, in Claim 13, delete "comprises" and insert -- comprising --, therefor.

In column 13, line 37, in Claim 14, before "transmit" insert -- free --.

In column 14, line 2, in Claim 16, before "free" insert -- the --.

In column 14, line 6, in Claim 17, delete "thoughput" and insert -- throughput --, therefor.

In column 14, line 8, in Claim 17, delete "buffer." and insert -- buffers. --, therefor.

UNITED STATES PATENT AND TRADEMARK OFFICE
CERTIFICATE OF CORRECTION

PATENT NO. : 7,483,377 B2
APPLICATION NO. : 11/069110
DATED : January 27, 2009
INVENTOR(S) : Lech Szumilas It is certified that error appears in the above-identified patent and that said Letters Patent is hereby corrected as shown below:

In column 14, line 16, in Claim 19, after "interval" insert -- to --.

Signed and Sealed this

Twenty-ninth Day of September, 2009

David J. Kappos
*Director of the United States Patent and Trademark Office*